(12) United States Patent
George et al.

(10) Patent No.: US 11,989,200 B2
(45) Date of Patent: May 21, 2024

(54) SYSTEM AND METHOD FOR LAMBDA BUCKETS

(71) Applicant: Nutanix, Inc., San Jose, CA (US)

(72) Inventors: Johnu George, Bangalore (IN); Manik Taneja, Bangalore (IN); Naveen Reddy Gundlagutta, Bangalore (IN); Nikhil Mundra, Bangalore (IN); Satyendra Singh Naruka, Bangalore (IN); Sirvisetti Venkat Sri Sai Ram, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/872,848

(22) Filed: Jul. 25, 2022

(65) Prior Publication Data

US 2023/0384958 A1    Nov. 30, 2023

(30) Foreign Application Priority Data

May 25, 2022   (IN) .............................. 202241029968

(51) Int. Cl.
*G06F 16/25* (2019.01)
*G06F 3/06* (2006.01)

(52) U.S. Cl.
CPC .......... *G06F 16/258* (2019.01); *G06F 3/0604* (2013.01); *G06F 3/0644* (2013.01); *G06F 3/0673* (2013.01)

(58) Field of Classification Search
CPC .... G06F 3/0644; G06F 3/0604; G06F 3/0673; G06F 9/5072; G06F 3/0665;
(Continued)

(56) References Cited

U.S. PATENT DOCUMENTS 8,549,518 B1   10/2013   Aron et al.
8,601,473 B1   12/2013   Aron et al.
(Continued)

OTHER PUBLICATIONS

Baldini, Ioana, et al. "Serverless Computing: Current Trends and Open Problems." arXiv preprint arXiv:1706.03178 (2017). (Year: 2017).*

(Continued)

*Primary Examiner* — Charles Rones
*Assistant Examiner* — Hewy H Li
(74) *Attorney, Agent, or Firm* — Foley & Lardner LLP

(57) ABSTRACT

An illustrative embodiment disclosed herein is an apparatus including a processor and a memory. In some embodiments, the memory includes programmed instructions that, when executed by the processor, cause the apparatus to upload an object to a source bucket in an object store and create a lambda bucket in the object store that is symlinked to the source bucket. In some embodiments, the lambda bucket is associated with a predefined transformation. In some embodiments, the memory includes the programmed instructions that, when executed by the processor, cause the apparatus to receive a request to download the object from the lambda bucket, detect that the object is in the source bucket, fetch the object from the source bucket, transform the object, by compute resources of the object store, using the predefined transformation, and download the transformed object.

17 Claims, 22 Drawing Sheets

(58) Field of Classification Search
CPC .... G06F 21/6218; G06F 16/258; G06F 21/62; G06F 21/6209; G06F 3/061; G06F 2212/1016; G06F 3/0647; G06F 3/0655
See application file for complete search history.

(56) References Cited

U.S. PATENT DOCUMENTS

| | | | |
|---|---|---|---|
| 8,850,130 | B1 | 9/2014 | Aron et al. |
| 8,863,124 | B1 | 10/2014 | Aron |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,772,866 | B1 | 9/2017 | Aron et al. |
| 2015/0169881 | A1* | 6/2015 | Yang ............... G06F 21/602 713/189 |
| 2019/0266170 | A1* | 8/2019 | Hazel ............... G06F 16/221 |
| 2021/0233045 | A1* | 7/2021 | Singh ............... G06Q 20/12 |
| 2021/0334147 | A1 | 10/2021 | Saglani et al. |
| 2021/0352136 | A1 | 11/2021 | Dojka et al. |
| 2022/0035622 | A1 | 2/2022 | Venkatakrishnan |
| 2022/0116455 | A1* | 4/2022 | Raghunath ........ H04L 41/5025 |
| 2022/0269380 | A1 | 8/2022 | Tertzakian et al. |
| 2023/0114321 | A1 | 4/2023 | Parekh et al. |

OTHER PUBLICATIONS

"S3 Object Lambda Overview". Posted Mar. 18, 2021. <https://www.youtube.com/watch?v=uTBgpK07E38&t=3s>. (Year: 2021).*
"Amazon Simple Storage Service". pp. 24, 27-39, 57-58, 159-161, 178, 548-555. Published Jul. 1, 2021. <http://web.archive.org/web/20210701074625/https://docs.aws.amazon.com/AmazonS3/latest/userguide/s3-userguide.pdf#Welcome>. (Year: 2021).*
"Tutorial: Transforming data for your application with S3 Object Lambda". Published Sep. 23, 2021. <http://web.archive.org/web/20210923223317/https://docs.aws.amazon.com/AmazonS3/latest/userguide/tutorial-s3-object-lambda-uppercase.html>. (Year: 2021).*
"Symbolic Links". Microsoft. Published Jan. 7, 2021. <https://learn.microsoft.com/en-us/windows/win32/fileio/symbolic-links>. (Year: 2021).*
"Tutorial: Using an Amazon S3 trigger to create thumbnail images," https://docs.aws.amazon.com/lambda/latest/dg/with-s3-tutorial.html#with-s3-tutorial-create-function-code, pp. 1-14.
Cano, Ignacio, et al. "Curator: Self-Managing Storage for Enterprise Clusters" (Mar. 27, 2017), from https://www.usenix.org/conference/nsdi17/.
Clouder, Alibaba, "Real-Time Image Processing by Object Storage Service," (Aug. 11, 2021), https://www.alibabacloud.com/blog/real-time-image-processing-by-object-storage-service_597996, pp. 1-10.
Poccia, Danilo, "Introducing Amazon S3 Object Lambda—Use Your Code to Process Data as It Is Being Retrieved from S3," (Mar. 18, 2021), https://aws.amazon.com/blogs/aws/introducing-amazon-s3-object-lambda-use-your-code-to-process-data-as-it-is-being-retrieved-from-s3/, pp. 1-10.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Shanaghy, E., "Using S3 Object Lambdas to Generate and Transform on the fly," (Mar. 19, 2021), https://eoins.medium.com/using-s3-object-lambdas-to-generate-and-transform-on-the-fly-874b0f27fb84, (pp. 1-8).
Transforming objects with S3 Object Lambda, https://docs.aws.amazon.com/AmazonS3/latest/userguide/transforming-objects.html, (pp. 1-2).
Tutorial: Transforming data for your application with S3 Object Lambda, https://docs.aws.amazon.com/AmazonS3/latest/userguide/tutorial-s3-object-lambda-uppercase.html (pp. 1-11).

* cited by examiner

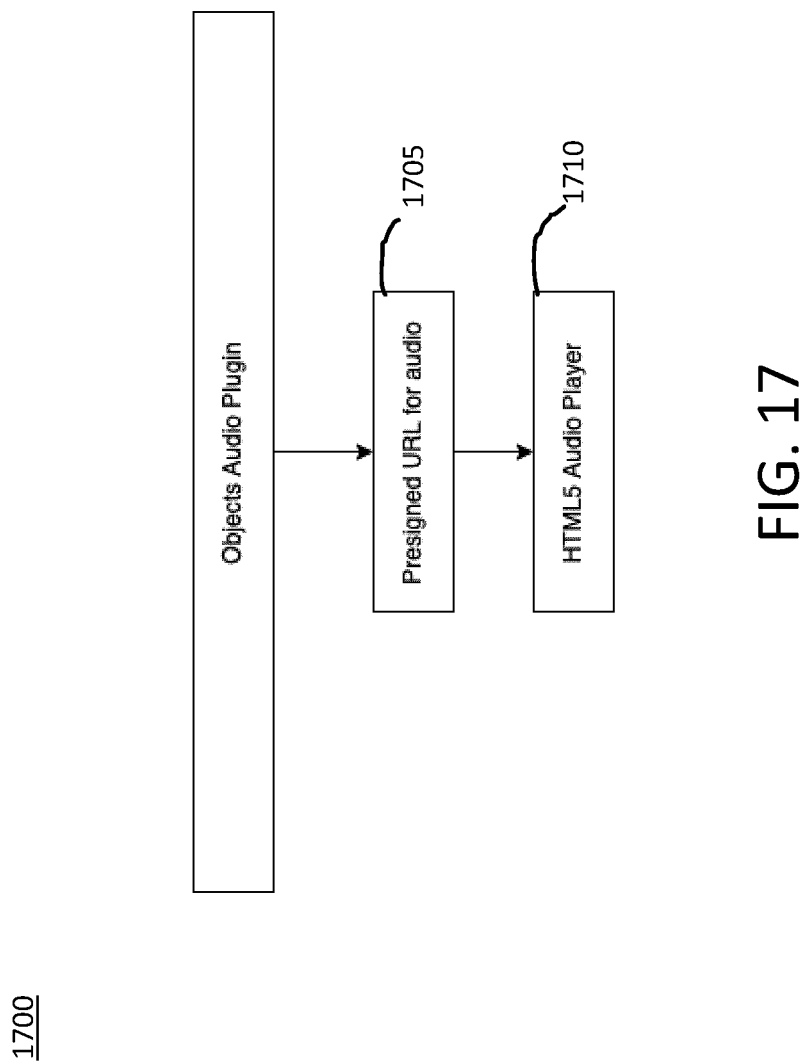

SYSTEM AND METHOD FOR LAMBDA BUCKETS

CROSS-REFERENCE TO RELATED APPLICATION

This application is related to and claims priority under 35 U.S. § 119(a) the Indian Patent Application No. 202241029968, filed May 25, 2022, titled "SYSTEM AND METHOD FOR LAMBDA BUCKETS," the entire contents of which are incorporated herein by reference for all purposes.

BACKGROUND

Data preprocessing in machine learning can be a crucial step that may help to enhance the quality of data to promote the extraction of meaningful insights from the data. Data preprocessing in machine learning refers to the technique of preparing (cleaning and organizing) the raw data to make it suitable for a building and training Machine Learning models.

SUMMARY

Aspects of the present disclosure relate generally to an object store environment, and more particularly to a system and method for leveraging lambda buckets for compute jobs.

An illustrative embodiment disclosed herein is an apparatus including a processor and a memory. In some embodiments, the memory includes programmed instructions that, when executed by the processor, cause the apparatus to upload an object to a source bucket in an object store and create a lambda bucket in the object store that is symlinked to the source bucket. In some embodiments, the lambda bucket is associated with a predefined transformation. In some embodiments, the memory includes the programmed instructions that, when executed by the processor, cause the apparatus to receive a request to download the object from the lambda bucket, detect that the object is in the source bucket, fetch the object from the source bucket, transform the object, by compute resources of the object store, using the predefined transformation, and download the transformed object.

Another illustrative embodiment disclosed herein is a non-transitory computer readable storage medium. In some embodiments, the medium includes instructions stored thereon that, when executed by a processor, cause the processor to upload an object to a source bucket in an object store and create a lambda bucket in the object store that is symlinked to the source bucket. In some embodiments, the lambda bucket is associated with a predefined transformation. In some embodiments, the medium includes the instructions stored thereon that, when executed by the processor, cause the processor to receive a request to download the object from the lambda bucket, detect that the object is in the source bucket, fetch the object from the source bucket, transform the object, by compute resources of the object store, using the predefined transformation, and download the transformed object.

Another illustrative embodiment disclosed herein is a computer-implemented method. In some embodiments, the method includes uploading, by a processor, an object to a source bucket in an object store and creating, by the processor, a lambda bucket in the object store that is symlinked to the source bucket. In some embodiments, the lambda bucket is associated with a predefined transformation. In some embodiments, the method includes receiving, by the processor, a request to download the object from the lambda bucket, detecting, by the processor, that the object is in the source bucket, fetching, by the processor, the object from the source bucket, transforming, by the processor, the object, by compute resources of the object store, using the predefined transformation, and downloading, by the processor, the transformed object.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 17 is a flowchart of an example method for previewing audio, in accordance with some embodiments of the present disclosure.

Figure 1:
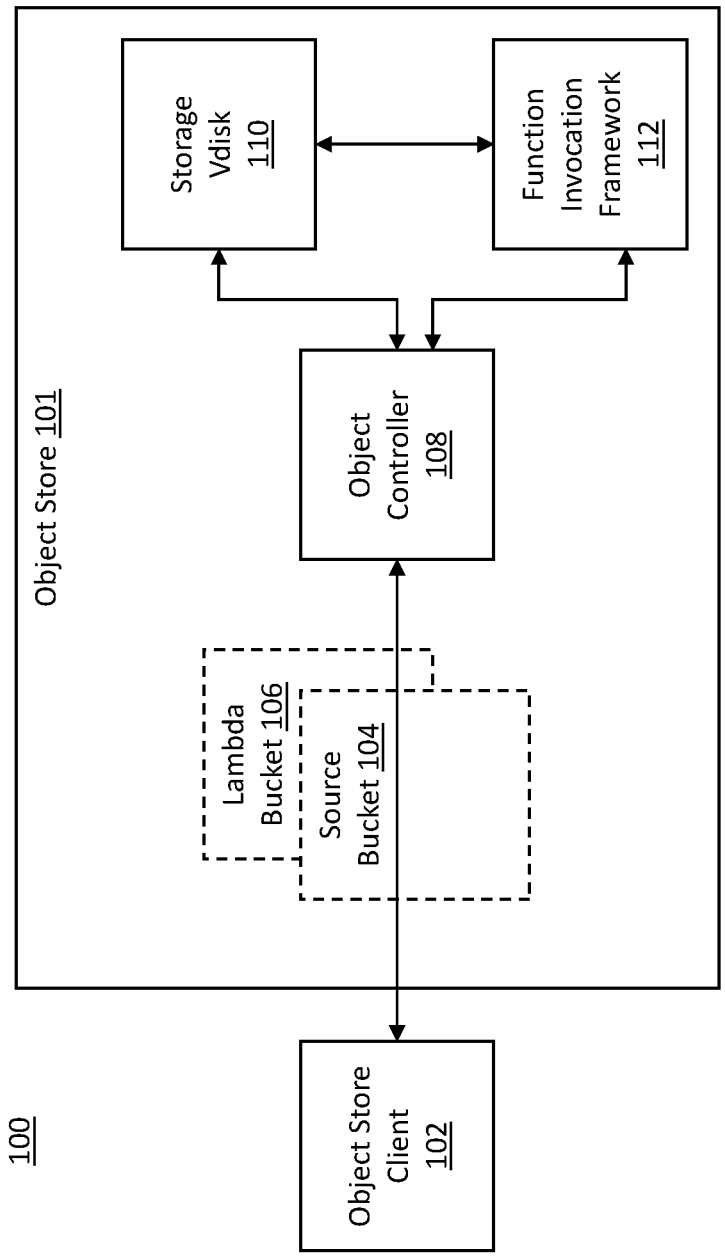
FIG. 1 is an example block diagram of an object store environment, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Embodiments of object stores lacking the improvements disclosed herein may have data in one location and compute running in a separate location. For example, such embodiments fetch data needed for a compute job from remote storage to the compute node, which is expensive because of network and storage amplification of data. In addition, latency and computational costs are increased due to having to wait for the data to be processed. Moreover, such embodiments may not offer flexibility in the type of functions available, or in allowing users to use different functions for different objects in a same bucket. Moreover, computing the data may require integration of third-party applications, which may not be easy to integrate or may increase cost. What is needed is a solution that can transform source data on the fly and provide to the client.

Disclosed herein are embodiments of a system and method to create a lambda bucket that can present a materialized view of the objects contained in a source bucket. The lambda bucket can be a symbolic link to the original bucket with the additional property that accesses via the lambda bucket can be transformed on the fly by the lambda function associated with the lambda bucket before being sent back to the user. Advantageously, embodiments of the system and method perform the transformations in the object store. Thus, the lambda bucket reduces network and storage overhead because the storage and compute can be in the same location. In addition, the lambda bucket allows seamless integration with big data applications, Hadoop, artificial intelligence (AI), machine learning (ML), and the like. Beneficially, the lambda bucket provides flexibility because users can provide customized functions to transform the objects on the fly.

Further disclosed herein are embodiments of a system and method to cache the transformed objects and store the transformed objects in the backend storage that can be referenced by the name of the lambda bucket. In some embodiments, the system and method can set a lifecycle policy on the lambda bucket so that all such transformed objects are automatically deleted after the expiration time configured as part of the life-cycle policy. Advantageously, this ensures that objects that have been transformed recently by the same lambda function do not need to be repeatedly transformed by subsequent accesses to the objects contained in the lambda bucket. Beneficially, this strategy can result in significantly lower latencies and reduced computational costs on the object storage backend and thereby improving the overall performance of the applications (Hadoop, AutoML) that are using the lambda or materialized buckets.

Further disclosed herein are embodiments of a system and method to create a second lambda bucket which is a symbolic link to the lambda bucket. Each of the lambda buckets can be associated with a different lambda function that provides a different transformation on the object. The object can be transformed by the lambda function associated with the first lambda bucket and the resulting bytes can be transformed by the lambda function associated with second lambda bucket before being streamed to the user. Furthermore, at each transformation step, the lambda buckets in the chain can cache the intermediate transformations of the objects, thereby boosting performance of the object fetches throughout the chain of lambda buckets. Advantageously, using multiple lambda functions on an object enables greater flexibility, scalability, and performance in transforming objects.

Further disclosed herein are embodiments of a system and method to transform objects on uploads or mutations on the source bucket that the lambda bucket is symbolically linked to. In other words, the object, or a copy of the object, can be transformed, in response to the object being uploaded to, or updated in, the source bucket, in accordance with a function associated with the lambda bucket that is symbolically linked to the source bucket. The metadata of the lambda object can be calculated during the transformation. Advantageously, transforming objects on mutations can significantly speed up HeadObject and GetObject operations on the lambda object as transforming the object decoupled from accessing the transformed object via the lambda bucket. Beneficially, this will also help in streaming the data sooner during GetObject operations and not wait for the completion of the transformation (e.g., reading the source object and running the transformation as specified in the lambda function). In addition, embodiments of this solution can be leveraged for use cases where the transformation is idempotent.

Further disclosed herein are embodiments of a system and method to perform a different transformation to a particular object. Some embodiments of the system and method can allow the user to create an access control rule that specifies under what conditions the object should be transformed or returned in its original form. Advantageously, this way different combinations of transformation functions can be applied to different objects contained within a bucket.

Embodiments lacking the improvements disclosed herein do not allow seamless viewing or editing the data of an object directly within the web app itself using the browser. With embodiments lacking the improvements disclosed herein, users first need to download or get the object and then use additional tools to view the contents of these objects. In some embodiments, these additional tools come with some additional cost and restrictions and can be avoided if the capabilities of modern web browsers are properly utilized.

Further disclosed herein are embodiments of a system and method to allow a native browser-based preview and edit functionality specifically to work with object stores and provide a self-sufficient end user solution for working with the objects. In some embodiments, the system and method render the previews of certain special kinds of objects, such as images, text, csv, videos, directly in the web browser. In some embodiments, the system and method provide direct editing capabilities for the previously mentioned objects. Some embodiments leverage object tags and the mime-type of these objects to build this functionality for the browser. Advantageously, the embodiments disclosed herein can provide a powerful end user experience to work with object stores without relying on additional 3rd party tools for many use cases. In addition to this, embodiments disclosed herein can provide a plugin-based architecture to later include support for previewing and editing other well-defined objects such as documents.

FIG. 1 illustrates an example block diagram of an object store environment 100, in accordance with some embodiments. The object store environment 100 includes an object store 101. The object store 101 can be referred to as an object storage platform. The object store 101 can store objects. An object can be composed of the object itself (e.g., object data) and metadata about the object (e.g., object metadata). An object can include unstructured data. An object can include immutable data (e.g., the object can be immutable).

The object store 101 can include buckets which are logical constructs where the objects are stored. The buckets can be an abstraction of a physical storage medium. For example, a bucket can be a uniform resource locator (URL), or other directory or path, that is associated with an allocated space in one or more storage media. The buckets can be implemented using virtual storage disks (storage vdisks), which in turn can be virtualized representations of physical storage disks or other storage media. Each bucket can be associated with a single set of resources. Each bucket can be associated with a single set of policies.

The object store 101 can have a flat hierarchy (e.g., no directory, sub-folders, or sub-buckets). The object store 101 can have a single namespace or a unique namespace for each of multiple tenants (e.g., users).

The object store environment 100 includes an object store client 102 coupled to the object store 101. A user can access, or otherwise manage, objects of the object store 101 using the object store client 102. The object store client 102 can be a web browser, a user interface, a training engine, a standard S3 client, or any other client suitable for accessing objects. Objects can be managed using a representational state transfer (RESTful) application programming interface (API) build on hypertext transfer protocol (HTTP) verbs (e.g., standard HTTP verbs such as GET, PUT, DELETE). Users can define object names when they upload an object. The object store 101 can prepend an object store namespace string and a bucket name to the object name. A directory structure can be simulated by adding a prefix string that includes a forward slash.

As described above, the object store 101 exposes buckets used to store objects. For example, the object store 101 exposes a source bucket 104 and a lambda bucket 106 to the object store client 102. The object store client 102 can store objects in a source bucket such as the source bucket 104. The object store client 102 can create a lambda bucket such as the lambda bucket 106. The lambda bucket may be referred to as a virtual bucket. The lambda bucket 106 is symbolically linked to the source bucket 104. When creating the lambda bucket 106, the object store client 102 associates the lambda bucket 106 with a function (e.g., a transformation, a transformation function, a lambda function, etc.).

In some embodiments, objects included in the source bucket 104 are visible to the object store client 102 via the lambda bucket 106. The object store client 102 can access an object (directly) from the source bucket 104, in which case the object can be returned untransformed. The object store client 102 can access an object via the lambda bucket 106, in which case the object can be transformed by the function associated with the lambda bucket 106 and returned to the object store client 102. In some embodiments, the source bucket 104 is a (standard) s3 bucket and the lambda bucket 106 is a symbolic link (a.k.a., symlink) to the (standard) s3 bucket. The lambda bucket 106 may appear to the user as a standard s3-compatible bucket. The lambda bucket 106 can support one or more operations such as HEAD, GET (e.g., GetObject), PUT (e.g., PutBucket), S3 Select, or LIST Objects, which can return the list of objects contained in the source bucket that the lambda bucket is symbolically linked to.

The object store client 102 can request to create a second lambda bucket associated with a second function. The second lambda bucket can be symbolically linked to the lambda bucket 106. This can be referred to as lambda bucket chaining. When the object store client 102 accesses the object from the second lambda bucket, the object can be transformed by the function associated with the lambda bucket 106, and then the transformed object can be transformed by the function associated with the second lambda bucket. The object store client 102 can request to associate a particular object in a source bucket 104 to a lambda function. When the object store client 102 accesses the object from the lambda bucket 106, the object can be transformed by the function associated with the object, and then the transformed object can be transformed by the function associated with the lambda bucket 106.

The object store 101 includes one or more object controllers such as object controller 108. The object controller 108 may serve object or bucket requests from the object store client 102. The object or bucket requests may correspond to one or more buckets in the object store 101. The client object request may be in accordance with REST API protocol. The client object request may include parameters associated with the object such as an object identifier, a bucket identifier, a source bucket identifier, a lambda bucket identifier, a function identifier, and the like. The object controller 108 may communicate with the storage vdisk 110 and/or the function invocation framework 112 in order to serve the object or bucket requests. The object controller 108 may be referred to as a protocol layer. In some embodiments, the object controller 108 may enable editing and viewing (e.g., previewing) of an object.

The object store 101 includes one or more storage vdisks such as the storage vdisk 110. The object controller 108, a metadata service, or some other component of the object store 101, may allocate storage space of the storage vdisk 110 for one or more of the buckets of the object store 101. To serve a request to store an object in a bucket, the object controller 108 may store the object in a storage space that is allocated for the bucket. The one or more storage vdisks may be referred to as a storage layer.

The object store 101 includes a function invocation framework 112. The function invocation framework 112 can access a function and transform an object using the function. For example, the function invocation framework 112 fetches an object stored in a source bucket (that is, a space of the storage vdisk 110 that is allocated for the source bucket) and transforms the object in accordance with a function that is associated with a lambda bucket symbolically linked to the source bucket. The object controller 108 may perform some of the operations attributed herein to the function invocation framework 112. The function invocation framework 112 may be referred to as a compute layer.

In some embodiments, the object controller 108 makes an API call to the function invocation framework 112. The function invocation framework 112 can execute an image that contains user-provided code for the transformation, fetch the original data from the source bucket in the storage layer, transform the original data, and return the transformed data back to the user via the object controller 108. In some embodiments, the function invocation framework 112 can be implemented as a serverless function framework. The function invocation framework 112 can be, for example, an OpenFaaS (Open Function as a Service) system.

Figure 2A:
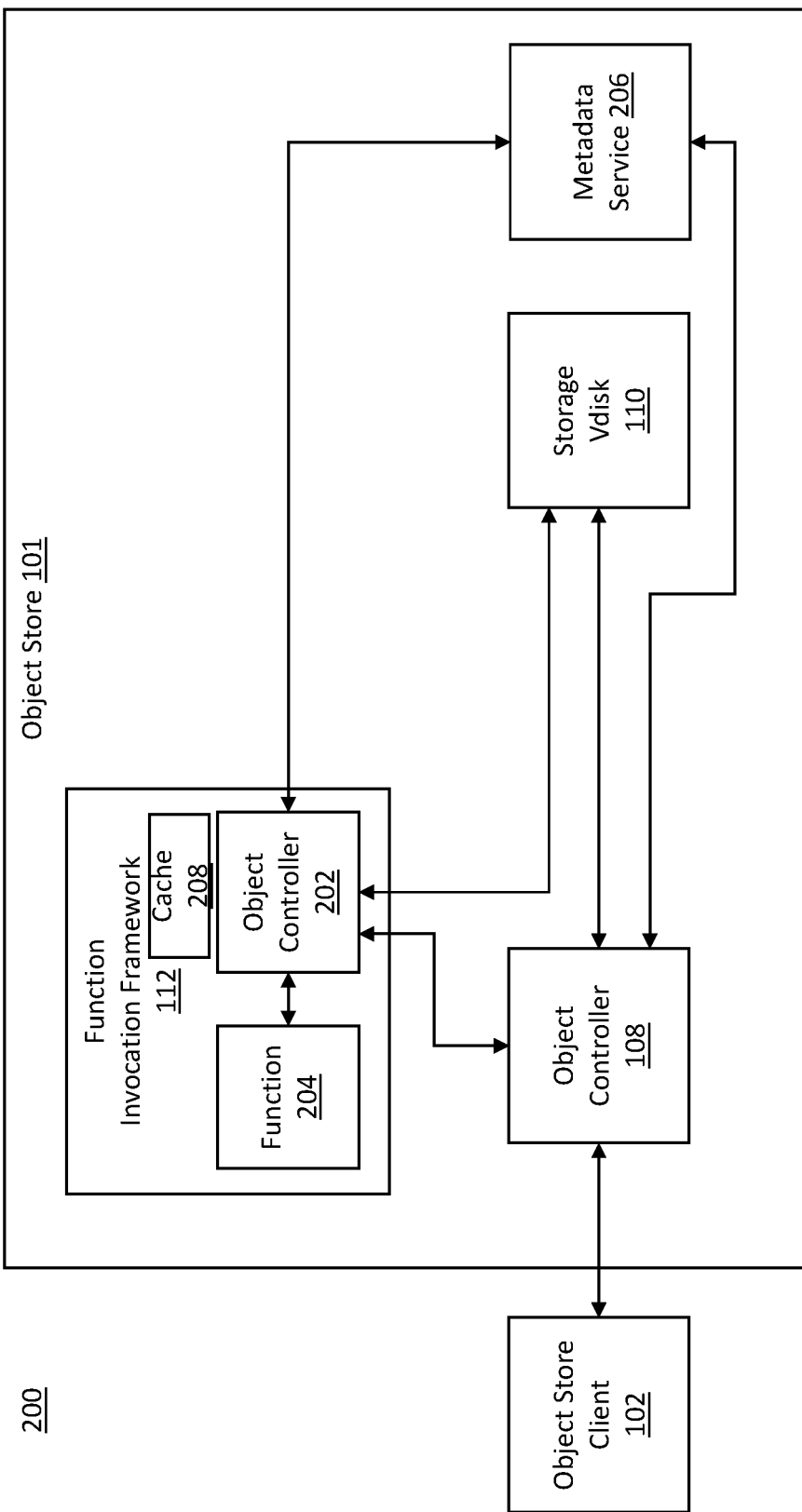
FIG. 2A is an example block diagram of an object store environment, in accordance with some embodiments of the present disclosure.

FIG. 2A is an example block diagram of an object store environment 200, in accordance with some embodiments of the present disclosure. In some embodiments, the object store environment 200 is an implementation of the object store environment 100. Although FIG. 2A does not show all the blocks of the object store environment 100, it is understood that the blocks of the object store environment 100 are included in the object store environment 200, in some embodiments.

As shown in FIG. 2A, the function invocation framework 112 includes an object controller 202. In some embodiments, the object controller 202 is similar to the object controller 108 except that the object controller 202 is adapted to serve requests specifically for one or more lambda buckets or objects associated therewith. For example, the object controller 202 may serve requests to create a lambda bucket, to create a lambda function, or to fetch an object from the lambda bucket. In some embodiments, the object controller 202 may enable editing and viewing (e.g., previewing) of a transformed object.

In some embodiments, the object controller 202 creates a lambda bucket associated with a function. The lambda bucket can be symbolically linked to the source bucket. The object controller 202 can transform the object by the function associated with the lambda bucket. The object controller 202 can create a second lambda bucket associated with a second function. The second lambda bucket can be symbolically linked to the lambda bucket. This can be referred to as lambda bucket chaining. The object controller 202 can transform the object by the function associated with the lambda bucket, and then the object controller 202 can transform the transformed object by the function associated with the second lambda bucket. The object controller 202 can associate a particular object in a source bucket with a lambda function. The object controller 202 can transform the object by the function associated with the object, and then the object controller 202 can transform the transformed object by the function associated with the lambda bucket.

In some embodiments, the object controller 202 transforms the object in response to receiving a request to access the object via the lambda bucket 106. In some embodiments, the object controller 202 transforms the object in response to the object controller 108 uploading the object to the source bucket 104 or updating the object in the source bucket 104. In some embodiments, the metadata (e.g., ContentLength, ETag) of the lambda object can be calculated during the transformation. Advantageously, transforming objects on uploads or updates can significantly speed up HeadObject and GetObject operations on the lambda object as transforming the object decoupled from accessing the transformed object via the lambda bucket. Beneficially, this will also help in streaming the hypertext transfer protocol (HTTP) headers (e.g., ETag, ContentLength) sooner during GetObject operations and not wait for the completion of the transformation (e.g., read source object and run transformation as specified in lambda).

In some embodiments, the object controller 108 performs some of operations attributed herein to the object controller 202. In some embodiments, the object controller 202 performs some of operations attributed herein to the object controller 108. In some embodiments, one object controller performs the functions of the object controller 108 and the object controller 202.

As shown in FIG. 2A, the function invocation framework 112 includes a memory or other storage medium to store one or more functions 204. In some embodiments, each of the one or more functions 204 include code to perform the function. The function can be written in any language, such as Python, Go, or Java. In some embodiments, the functions include one or more of one or more functions to map-reduce, one or more functions to redact data, one or more functions to compress data, one or more functions to preprocess machine learning data before transferring the data to a training engine, and the like.

As shown in FIG. 2A, the function invocation framework 112 includes a cache 208. The object controller 202 can store the transformed object in the cache 208. The object controller 202 can store the function 204 in the cache 208. In the case of lambda bucket chaining, the object controller 202 can store the intermediate transformations of the objects in the cache 208. The object controller 202 or a lifecycle component can move the transformed object from the cache 208 to a backend storage medium, such as the storage vdisk 110, after a predetermined amount of time, which may be part of a life-cycle policy. In some embodiments, the object store client 102 can set a lifecycle policy on the lambda bucket so that all such transformed objects are automatically deleted from the cache 208 or the storage vdisk 110 after the expiration time configured as part of the life-cycle policy.

The object store environment 200 includes a metadata service 206 coupled to the object controller 108 and the object controller 202. In some embodiments, the metadata service 206 writes (e.g., updates) metadata associated with an object read request or an object write request from an object controller (e.g., the object controller 108 or the object controller 202). The metadata service 206 may serve the metadata update request by storing the metadata in a storage medium. The storage medium may include a backend storage medium such as one or more instances of a storage vdisk 110. The storage medium may include memory. The metadata service 206 may store the metadata in a data structure such as a log-structured-merge-tree (LSM tree) or other LSM data structure. A life-cycle policy may determine, where different types of metadata are stored, how long metadata is stored in memory, when it is moved to a backend storage medium, or when it is deleted. In some embodiments, the object store environment 200 includes multiple instances of the metadata service 206. For example, in some embodiments, the object controller 108 is in communication with a first instance of the metadata service 206 and the object controller 202 is in communication with a second instance of the metadata service 206. The metadata service 206 may be a part of the storage layer.

In some embodiments, the object store environment 200 includes a protocol adapter that couples the object store client 102 to the object controller 108. In some embodiments, the protocol adapter receives APIs from the object store client 102. The APIs may be standardized APIs such as Representational State Transfer (REST) APIs, S3 APIs, APIs native to the object store environment 200, etc. In some embodiments, the protocol adapter converts (e.g., transforms, encodes, decodes, removes headers of, appends headers of, encapsulates, de-encapsulates) the APIs to generate APIs that are native to the object store environment 200. In some embodiments, the protocol adapter sends the converted API to the object controller 108. In embodiments including the protocol adapter, the protocol adapter may be a part of the protocol layer that includes the object controller 108.

An example workflow (e.g., use case) for the object store environment 200, a user creates a bucket "image" and uploads some image files to the object. The user creates a lambda bucket "lambda-redacted-images" and associates an image redaction program as the lambda function and symlinks the new bucket to the original bucket "images." Creating the lambda bucket may be carried out via a proprietary extension to the S3 Create bucket protocol. The new bucket "lambda-redacted-images" is created and shares the same access rules as that of the original bucket "images." The application can access the same set of images stored in the original bucket via the bucket "lambda-redacted-images," the only difference being that the images downloaded from the lambda bucket are transformed, e.g., the sensitive data is redacted before sending them back to the client.

Figure 2B:
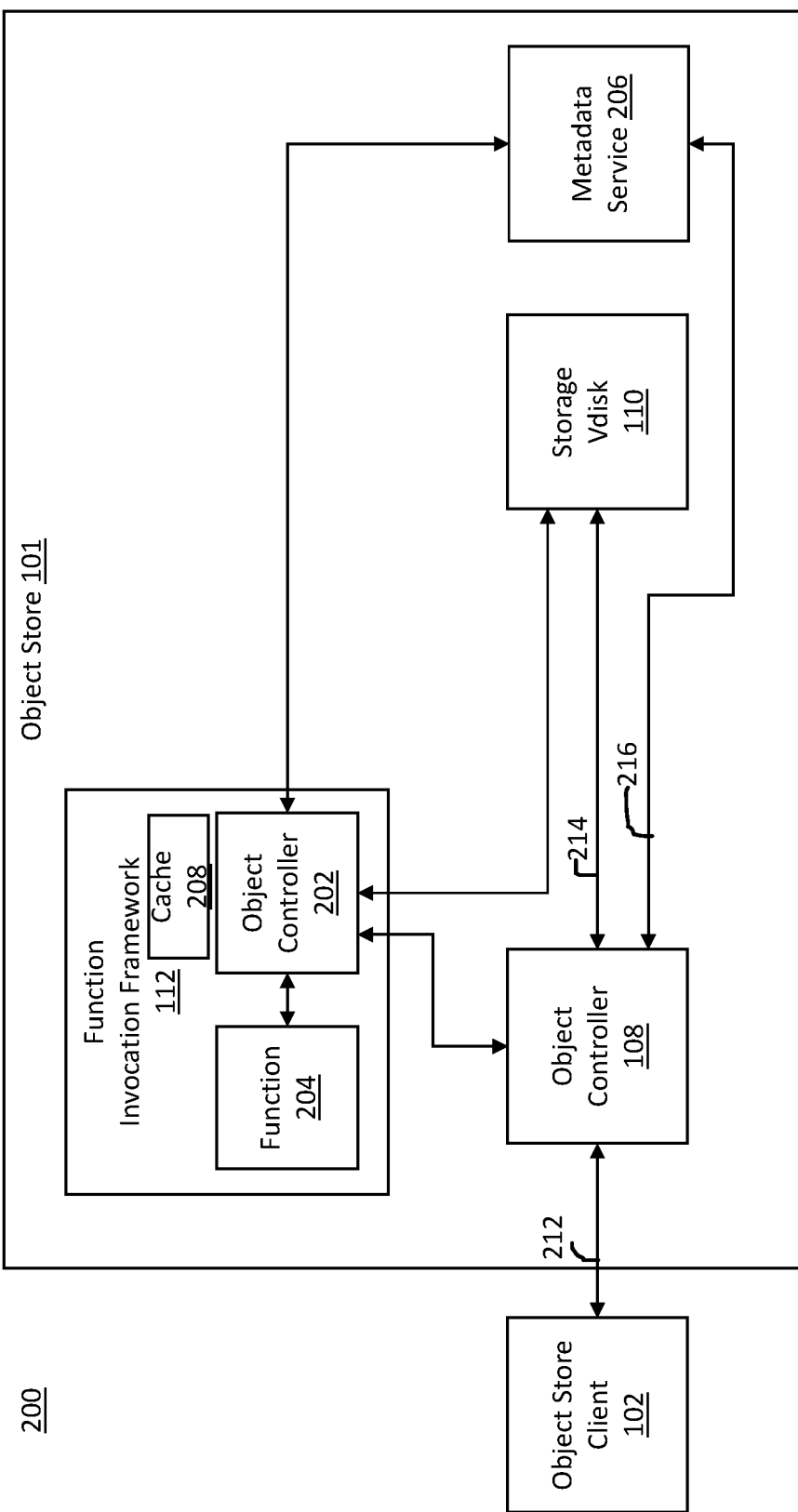
FIG. 2B is an example block diagram of the object store environment of FIG. 2A that illustrates uploading an object to a source bucket, in accordance with some embodiments of the present disclosure.

FIG. 2B is an example block diagram of the object store environment 200 of FIG. 2A that illustrates uploading an object to a source bucket, in accordance with some embodiments of the present disclosure. At operation 212 the object store client 102 sends an object PUT request to the object controller 108. An example request is PUT <source_bucket>/a.txt, where source_bucket is the source bucket and a.txt is the object. At operation 214, the object controller 108 stores the object in the storage vdisk 110. At operation 216, the object controller 108 requests that the metadata service 206 store metadata associated with the object. For example, the object controller 108 requests that the metadata service 206 store an address or other indicator of the location in the storage vdisk 110 in which the object is stored. The object controller 108 may request that the metadata service 206 store a name or other indicator of the source bucket in which the object is stored.

Figure 2C:
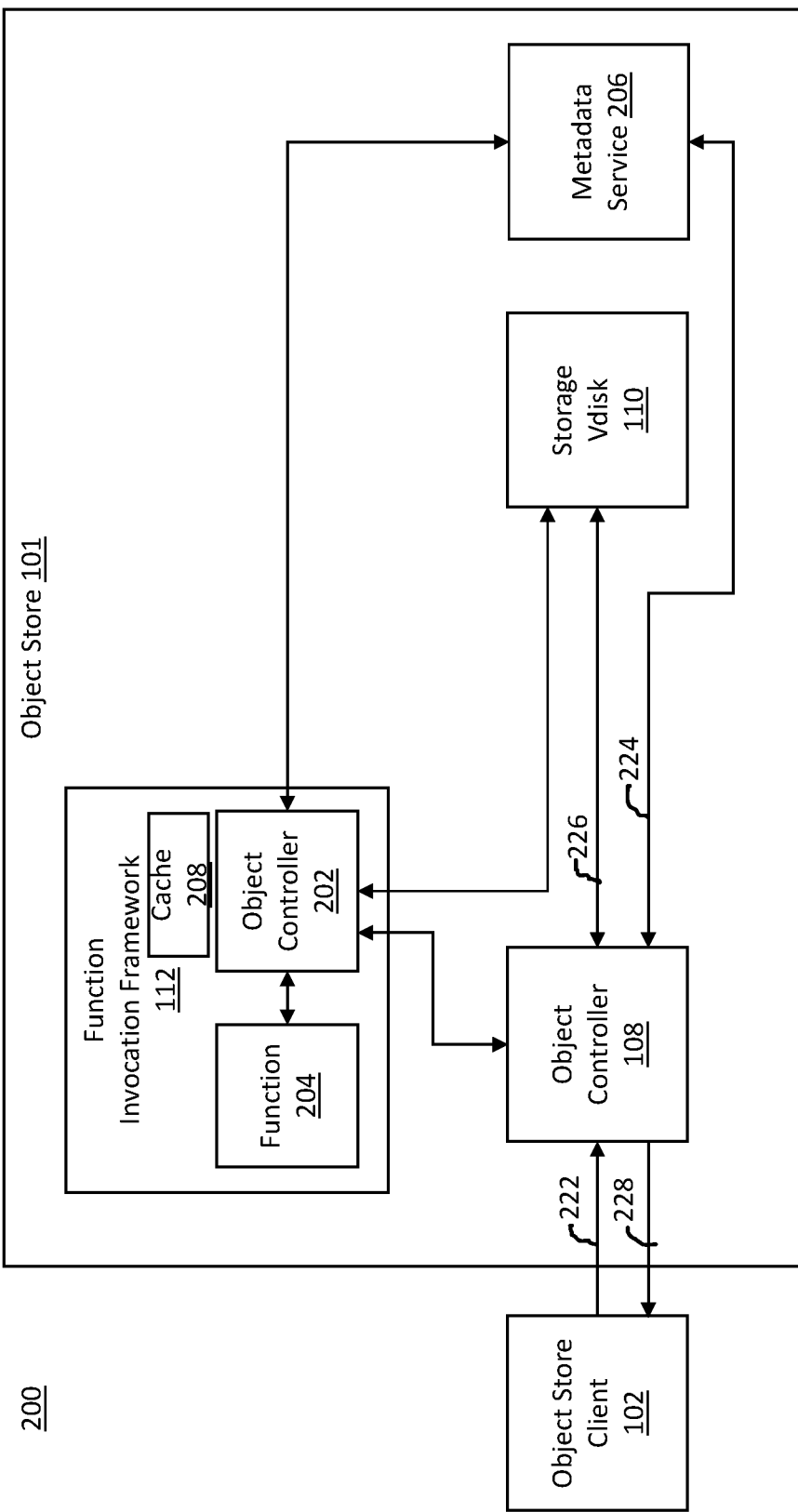
FIG. 2C is an example block diagram of the object store environment of FIG. 2A that illustrates fetching an object from a source bucket, in accordance with some embodiments of the present disclosure.

FIG. 2C is an example block diagram of the object store environment 200 of FIG. 2A that illustrates fetching an object from a source bucket, in accordance with some embodiments of the present disclosure. At operation 222, the object store client 102 sends an object GET request to the object controller 108. The request may include one or more parameters such as the object and the name of the source bucket. An example request is GET <source_bucket>/a.txt, where source_bucket is the source bucket and a.txt is the object. At operation 224, the object controller 108 fetches an address from the metadata service 206. At operation 226, the object controller 108 fetches the object from the location in the storage vdisk 110 at the address provided by the metadata service 206. At operation 228, the object controller 108 returns the object to the object store client 102.

Figure 2D:
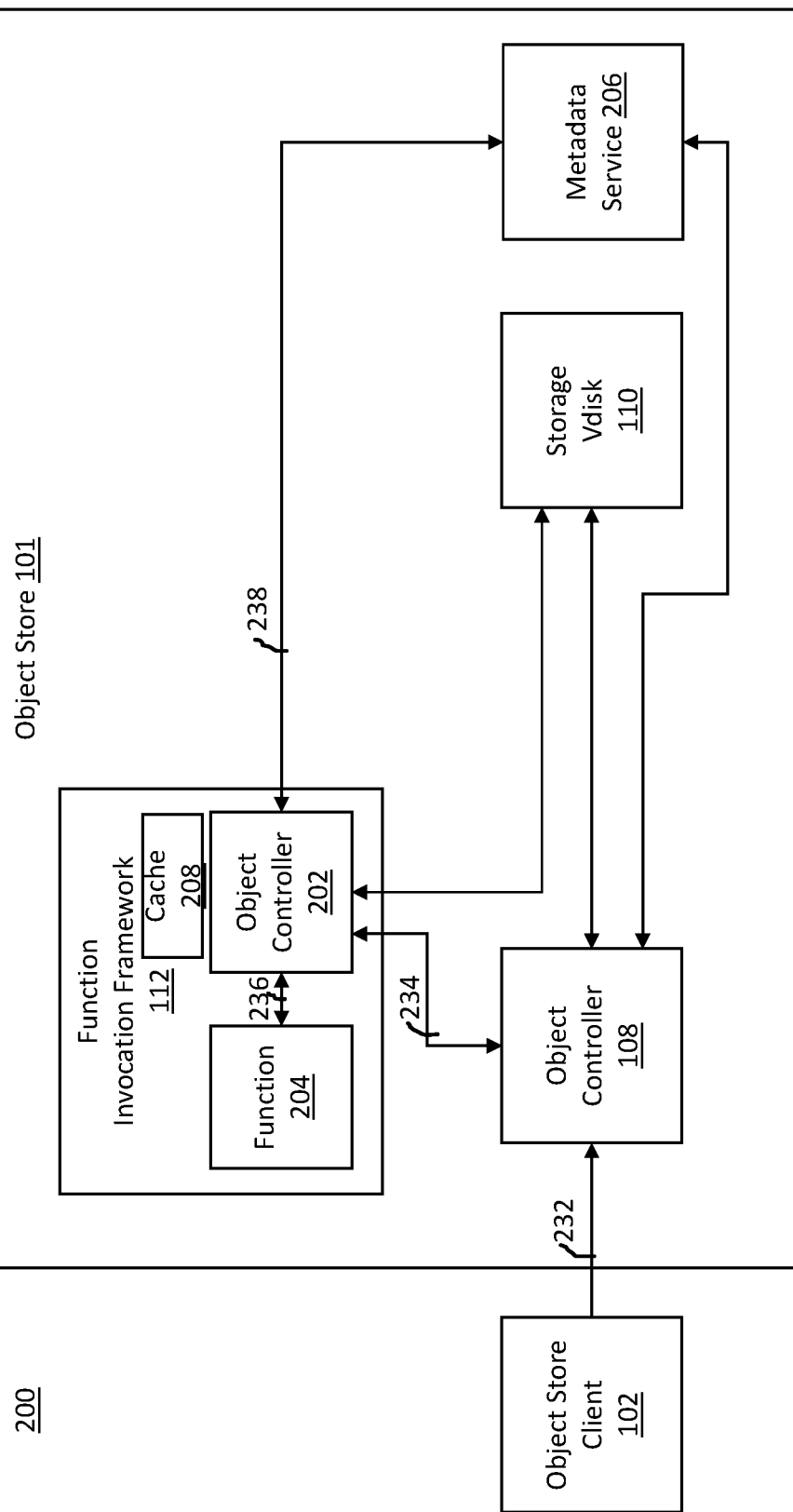
FIG. 2D is an example block diagram of the object store environment of FIG. 2A that illustrates creating a lambda function, in accordance with some embodiments of the present disclosure.

FIG. 2D is an example block diagram of the object store environment 200 of FIG. 2A that illustrates creating a lambda function, in accordance with some embodiments of the present disclosure. At operation 232, the object store client 102 sends a request to the object controller 108 to create a lambda function. At operation 234, the object controller 108 forwards the request to the object controller 202. At operation 236, the object controller 202 creates the function 204 and stores it in a storage medium. At operation 238, the object controller 202 requests that the metadata service 206 store metadata associated with the function 204.

Figure 2E:
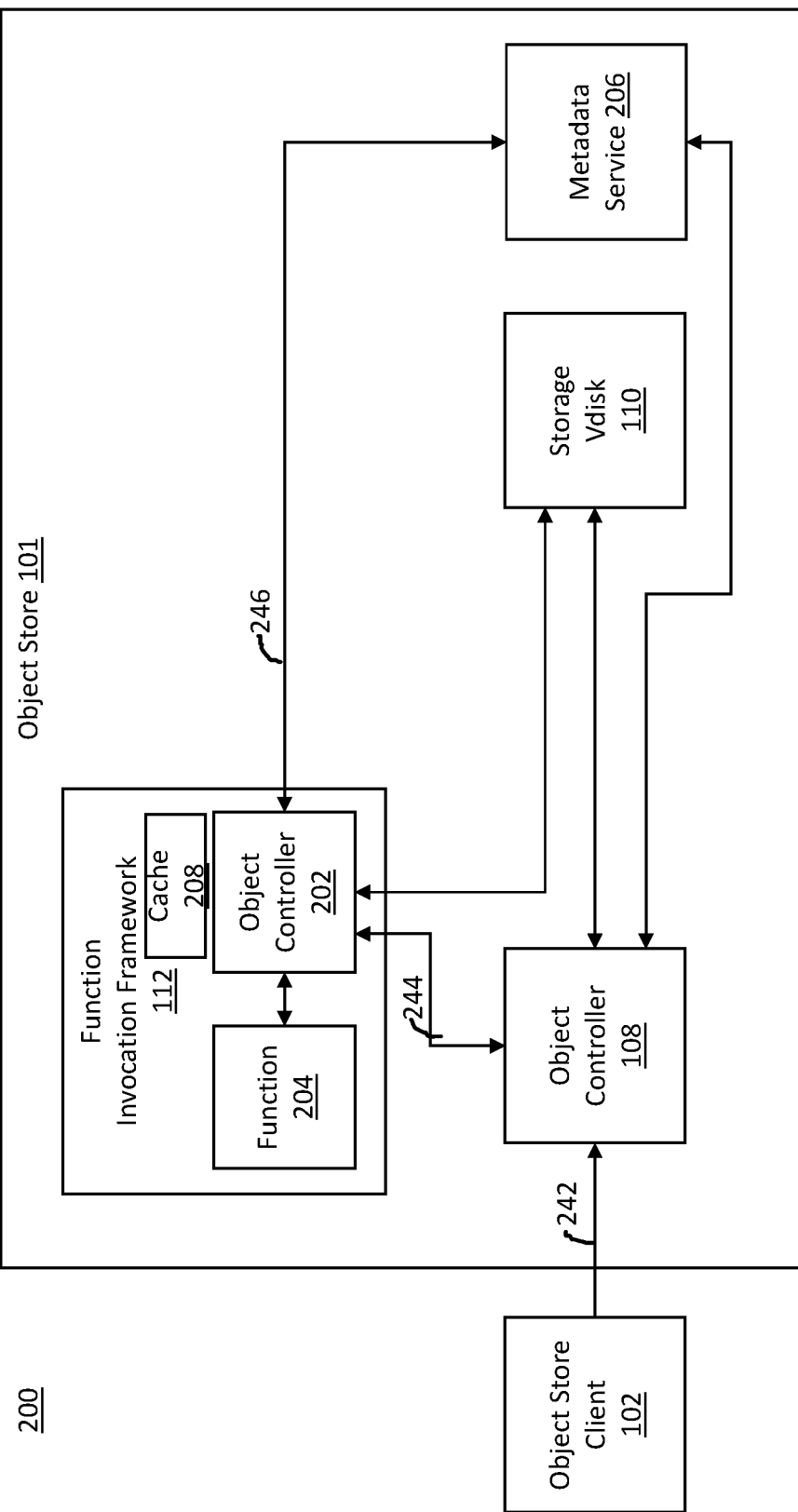
FIG. 2E is an example block diagram of the object store environment of FIG. 2A that illustrates creating a lambda bucket, in accordance with some embodiments of the present disclosure.

FIG. 2E is an example block diagram of the object store environment 200 of FIG. 2A that illustrates creating a lambda bucket, in accordance with some embodiments of the present disclosure. At operation 242, the object store client 102 sends a lambda bucket PUT (e.g., PutBucket API) request to the object controller 108. The request may include one or more parameters such as the name of the lambda bucket, the name of the source bucket, or the lambda function. At operation 244, the object controller 108 forwards the request to the object controller 202. The object controller 202 creates a lambda bucket and symbolically links it to the source bucket. At operation 246, the object controller requests that the metadata service 206 store metadata associated with the lambda bucket.

Figure 2F:
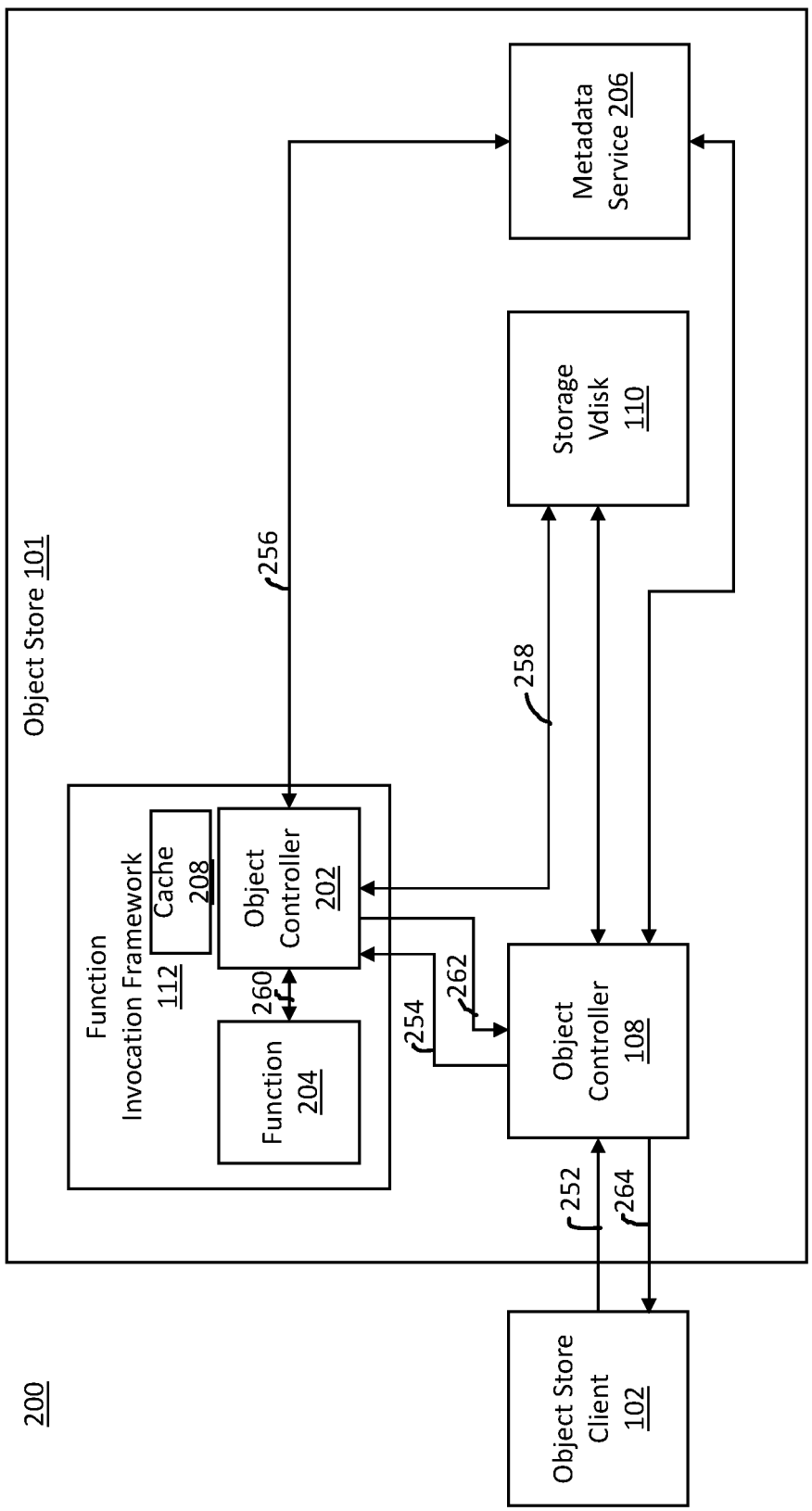
FIG. 2F is an example block diagram of the object store environment of FIG. 2A that illustrates fetching an object from a lambda bucket, in accordance with some embodiments of the present disclosure.

FIG. 2F is an example block diagram of the object store environment 200 of FIG. 2A that illustrates fetching an object from a lambda bucket, in accordance with some embodiments of the present disclosure. At operation 252, the object store client 102 sends an object GET request to the object controller 108. The request may include one or more parameters such as the object and the name of the lambda bucket. In some embodiments, the object GET request specifies a source bucket that the lambda bucket is symbolically linked to. An example request is GET <lambda_bucket>/a.txt, where lambda_bucket is the lambda bucket and a.txt is the object. At operation 254, the object controller 108 forwards the request to the object controller 202. In some embodiments, the object controller 202 determines the source bucket that the lambda bucket is symbolically linked to. In some embodiments, the object controller 202 detects that the object is in the source bucket that the lambda bucket is symbolically linked to.

In some embodiments, the object controller 202 uses one or more parameters, such as the object name, the source bucket name, or the lambda bucket name, to look up an address of the location in the metadata service 206. The address can correspond to the location in the storage vdisk in which the object is stored. The address can be within an address range that corresponds to a space in the storage vdisk allocated to the source bucket. At operation 256, the object controller 202 fetches the address from the metadata service 206.

At operation 258, the object controller 202 fetches the object from the location in the storage vdisk at the address provided by the metadata service 206. At operation 260, the object controller 202 fetches the function 204 and transforms the object in accordance with function 204. At operation 262, the object controller 202 returns the transformed object to the object controller 108. At operation 264, the object controller 108 returns the transformed object to the object store client 102. Although FIG. 2F illustrates that the object controller 202 transforms the object in response to receiving a request to access the object via the lambda bucket 106, in some embodiments, the object controller 202 may transform the object in response to the object controller 108 uploading the object to the source bucket 104 or updating the object in the source bucket 104.

Figure 3:
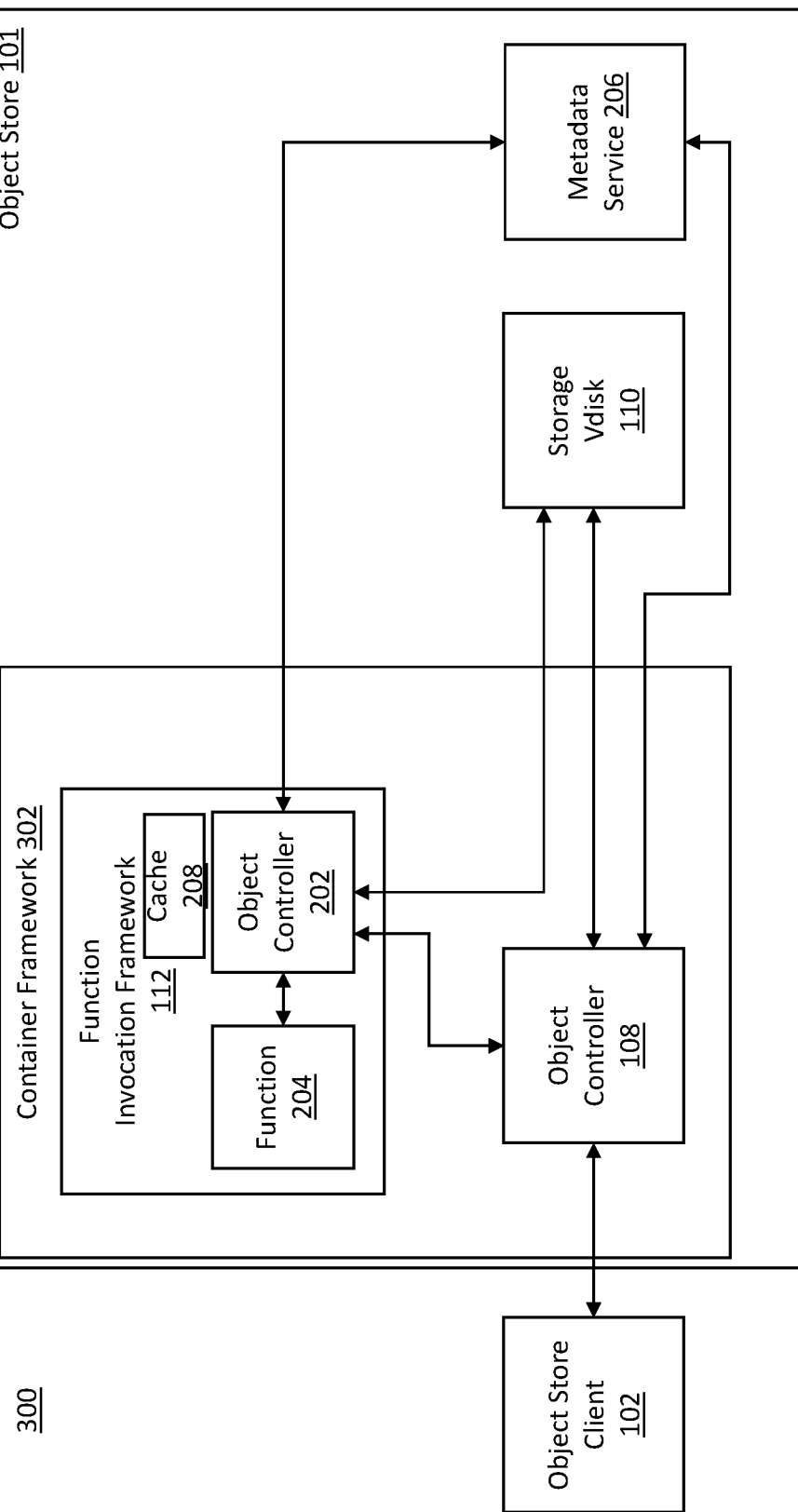
FIG. 3 is an example block diagram of an object store environment, in accordance with some embodiments of the present disclosure.

FIG. 3 is an example block diagram of an object store environment 300, in accordance with some embodiments of the present disclosure. In some embodiments, the object store environment 300 is an implementation of the object store environment 100 and the object store environment 200. Although FIG. 2A does not show all the blocks of the object store environment 100, it is understood that the blocks of the object store environment 100 are included in the object store environment 200, in some embodiments.

The object store environment 300 includes a container framework 302. The container framework 302 may deploy containers for some or all the components in the container framework 302 to run on. For example, in some embodiments, the container framework 302 deploys a first container for the object controller 108 to run on, a second container for the object controller 202 to run on, and a third container for the function 204 to be stored on. A container has its own file system, share of compute resources such as central processing unit (CPU), memory, process space, and more. For example, the first container running the object controller 108 and the second container running the object controller 202 may share a same CPU. In some embodiments, the first container running the object controller 108 and the second container running the object controller 202 may use different CPUs. As they are decoupled from the underlying infrastructure, the containers can be portable across clouds and operating system (OS) distributions. Each container can include a container image, which is a ready-to-run software package that includes the code and any runtime it requires, application and system libraries, and default values for configurations. The container framework 302 can be, for example, Kubernetes. In some embodiments, the function invocation framework 112 is installed on the container framework 302.

Although the object store environment 300 is implemented using containers, the object store environment 300 additionally or alternatively be implemented using pods, virtual machines, functions, physical servers, or the like. In some embodiments, the object store environment 300 is a hyperconverged (HCI) storage solution where any compute job can be pushed down to the storage layer. Since the HCI stack is aware of the underlying data placement, it can take advantage of data locality.

Each of the elements or entities of the object store environments 100-300 is implemented using hardware, software, or a combination of hardware or software, in one or more embodiments. For instance, the object controller 202 may be implemented as an apparatus comprising custom VLSI circuits or gate arrays, off-the-shelf semiconductors such as logic chips, transistors, or other discrete components. The object controller 202 may be implemented as an apparatus comprising programmable hardware devices such as field programmable gate arrays, programmable array logic, programmable logic devices, or the like. The object controller 202 can include any application, program, library, script, task, service, process or any type and form of executable instructions executed by one or more processors, in one or more embodiments. The object controller 202 and the object controller 108 can share a same processor or use different processors. Each of the one or more processors includes hardware. The instructions may be stored on one or more computer readable and/or executable storage media including non-transitory storage media such as non-transitory storage media (e.g., the storage vdisk 110) with respect to FIG. 1.

Figure 4:
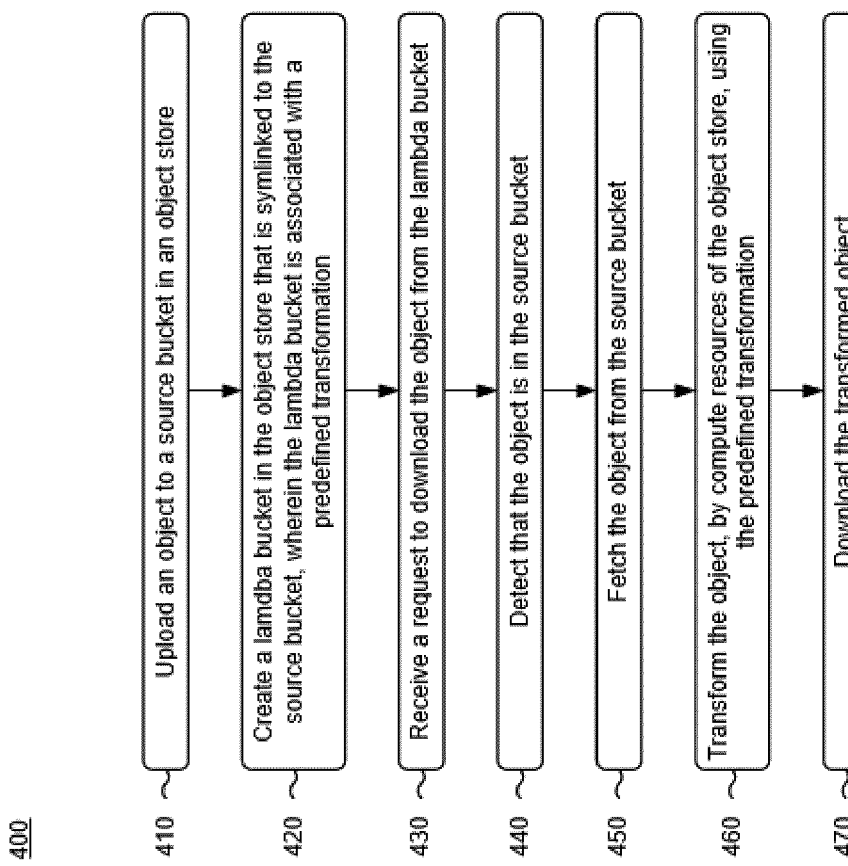
FIG. 4 is a flowchart of an example method for transforming an object using a lambda bucket, in accordance with some embodiments of the present disclosure.

FIG. 4 is a flowchart of an example method 400 for transforming an object using a lambda bucket, in accordance with some embodiments of the present disclosure. The method 400 may be implemented using, or performed by, one of the object store environments 100-300, one or more components of the one of the object store environments 100-300 (e.g., the object controller 202, the object controller 108, or both), one or more processors associated with the one of the object store environments 100-300, or one or more processors associated with the one or more components of the one of the object store environments 100-300. Additional, fewer, or different operations may be performed in the method 400 depending on the embodiment.

At operation 410, the processor (e.g., a processor associated with the object controller 108 and the object controller 202) uploads an object to a source bucket (e.g., the source bucket 104) in an object store (e.g., the object store 101). At operation 420, the processor creates a lambda bucket (e.g., the lambda bucket 106) in the object store that is symlinked to the source bucket. In some embodiments, the lambda bucket is associated with a predefined transformation (e.g., the function 204).

At operation 430, the processor receives a request to download the object from the lambda bucket. At operation 440, the processor detects that the object is in the source bucket. At operation 450, the processor fetches the object from the source bucket. At operation 460, the processor transforms the object, by compute resources of the object store, using the predefined transformation, to generate a transformed object. At operation 470, the processor downloads the transformed object. In some embodiments, operations 440-470 are in response to receiving the request.

In some embodiments, the processor caches, in a cache (e.g., the cache 208), the transformed object in the lambda bucket. In some embodiments, the processor sets a lifecycle policy on the lambda bucket that causes the transformed object to be deleted upon a predefined time elapsing.

In some embodiments, the processor creates a second lambda bucket in the object store that is symlinked to the lambda bucket. In some embodiments, the second lambda bucket is associated with a second predefined transformation. In some embodiments, the processor transforms the transformed object, by the compute resources of the object store, using the second predefined transformation, to generate a second transformed object.

In some embodiments, the processor associates a lambda function with the object in the source bucket. In some embodiments, in response to receiving the request to download the object from the lambda bucket, the processor detects that the object is associated with the lambda function. In some embodiments, the processor transforms the object, by the compute resources of the object store, using the lambda function associated with the object, to generate a second transformed object. In some embodiments, the processor transforms the second transformed object, by the compute resources of the object store, using the predefined transformation, to generate a third transformed object.

Figure 5:
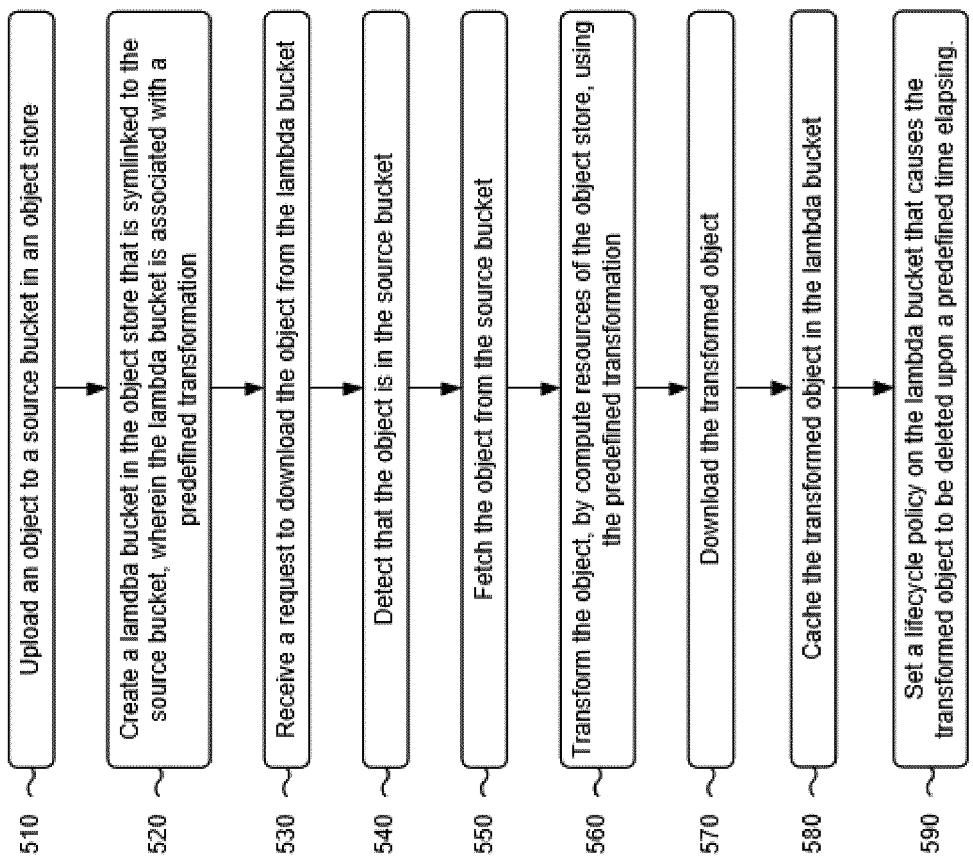
FIG. 5 is a flowchart of an example method for caching a transformed object, in accordance with some embodiments of the present disclosure.

FIG. 5 is a flowchart of an example method 500 for caching a transformed object, in accordance with some embodiments of the present disclosure. The method 500 may be implemented using, or performed by, one of the object store environments 100-300, one or more components of the one of the object store environments 100-300 (e.g., the object controller 202, the object controller 108, or both), one or more processors associated with the one of the object store environments 100-300, or one or more processors associated with the one or more components of the one of the object store environments 100-300. Additional, fewer, or different operations may be performed in the method 500 depending on the embodiment.

At operation 510, the processor (e.g., a processor associated with the object controller 108 and the object controller 202) uploads an object to a source bucket (e.g., the source bucket 104) in an object store (e.g., the object store 101). At operation 520, the processor creates a lambda bucket (e.g., the lambda bucket 106) in the object store that is symlinked to the source bucket. In some embodiments, the lambda bucket is associated with a predefined transformation (e.g., the function 204).

At operation 530, the processor receives a request to download the object from the lambda bucket. At operation 540, the processor detects that the object is in the source bucket. At operation 550, the processor fetches the object from the source bucket. At operation 560, the processor transforms the object, by compute resources of the object store, using the predefined transformation. At operation 570, the processor downloads the transformed object. At operation 580, the processor caches the transformed object in the lambda bucket. In some embodiments, the transformed object can be stored in a cache such as the cache 208. At operation 590, the processor sets a lifecycle policy on the lambda bucket that causes the transformed object to be deleted upon a predefined time elapsing. In some embodiments, operations 540-590 are in response to receiving the request.

Figure 6:
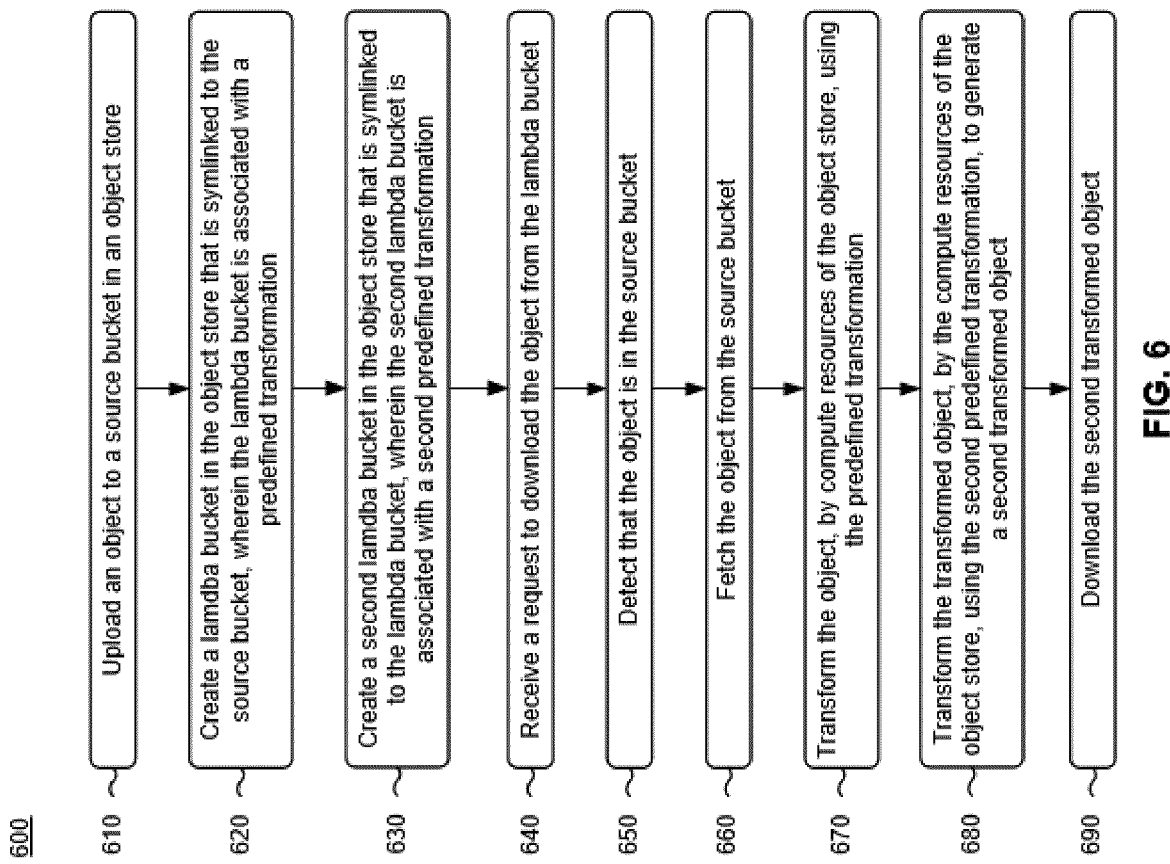
FIG. 6 is a flowchart of an example method for chaining lambda buckets, in accordance with some embodiments of the present disclosure.

FIG. 6 is a flowchart of an example method 600 for chaining lambda buckets, in accordance with some embodiments of the present disclosure. The method 600 may be implemented using, or performed by, one of the object store environments 100-300, one or more components of the one of the object store environments 100-300 (e.g., the object controller 202, the object controller 108, or both), one or more processors associated with the one of the object store environments 100-300, or one or more processors associated with the one or more components of the one of the object store environments 100-300. Additional, fewer, or different operations may be performed in the method 600 depending on the embodiment.

At operation 610, the processor (e.g., a processor associated with the object controller 108 and the object controller 202) uploads an object to a source bucket (e.g., the source bucket 104) in an object store (e.g., the object store 101). At operation 620, the processor creates a lambda bucket (e.g., the lambda bucket 106) in the object store that is symlinked to the source bucket. In some embodiments, the lambda bucket is associated with a predefined transformation (e.g., the function 204). At operation 630, the processor creates a second lambda bucket in the object store that is symlinked to the lambda bucket. In some embodiments, the second lambda bucket is associated with a second predefined transformation.

At operation 640, the processor receives a request to download the object from the lambda bucket. At operation 650, the processor detects that the object is in the source bucket. At operation 660, the processor fetches the object from the source bucket. At operation 670, the processor transforms the object, by compute resources of the object store, using the predefined transformation, to generate a transformed object. At operation 680, the processor transforms the transformed object, by the compute resources of the object store, using the second predefined transformation, to generate a second transformed object. At operation 690, the processor downloads the second transformed object. In some embodiments, operations 650-690 are in response to receiving the request.

Figure 7:
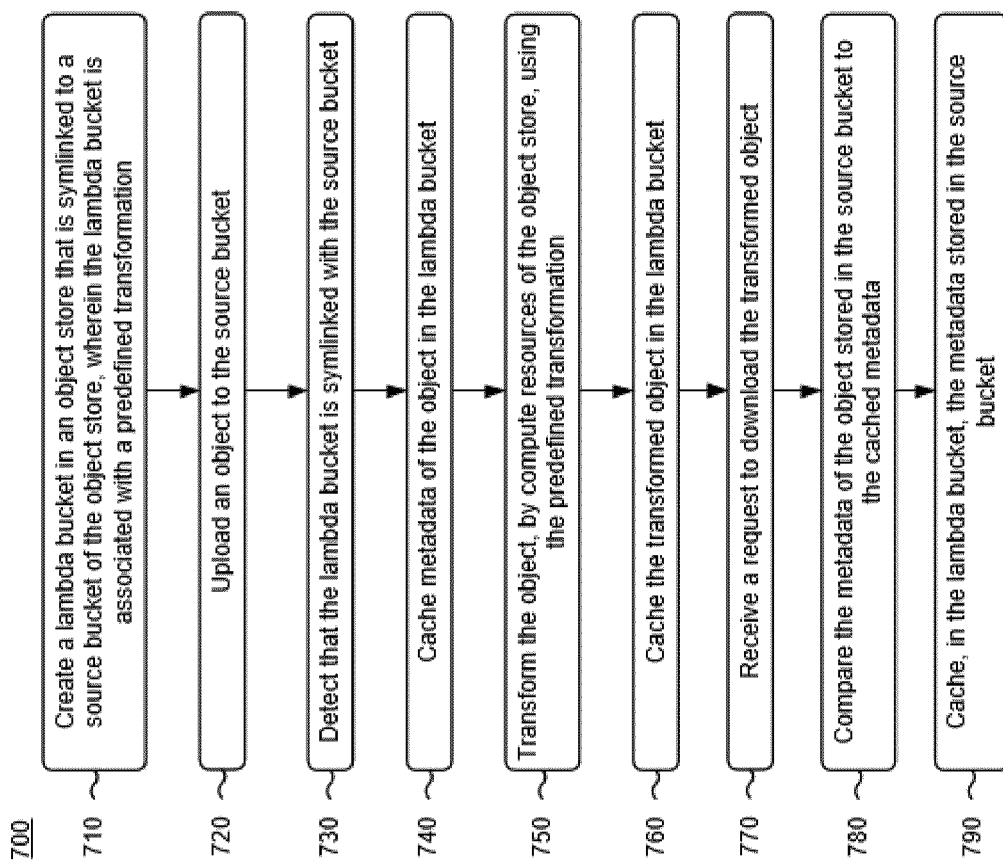
FIG. 7 is a flowchart of an example method for transforming objects on mutations in the source bucket, in accordance with some embodiments of the present disclosure.

FIG. 7 is a flowchart of an example method 700 for transforming objects on mutations in the source bucket, in accordance with some embodiments of the present disclosure. The method 700 may be implemented using, or performed by, one of the object store environments 100-300, one or more components of the one of the object store environments 100-300 (e.g., the object controller 202, the object controller 108, or both), one or more processors associated with the one of the object store environments 100-300, or one or more processors associated with the one or more components of the one of the object store environments 100-300. Additional, fewer, or different operations may be performed in the method 700 depending on the embodiment.

At operation 710, the processor (e.g., a processor associated with the object controller 108 and the object controller 202) creates a lambda bucket (e.g., the lambda bucket 106) in an object store (e.g., the object store 101). In some embodiments, the lambda bucket is symlinked to a source bucket (e.g., the source bucket 104) of the object store. In some embodiments, the lambda bucket is associated with a predefined transformation (e.g., the function 204).

At operation 720, the processor uploads an object to the source bucket. In some embodiments, the processor updates the object in the source bucket. At operation 730, the processor detects that the lambda bucket is symlinked with the source bucket. At operation 740, the processor caches metadata of the object in the lambda bucket. At operation 750, the processor transforms the object, by compute resources of the object store, using the predefined transformation. At operation 760, the processor caches the transformed object in the lambda bucket. In some embodiments, operations 730-760 are in response to uploading the object to the source bucket or updating the object in the source bucket.

At operation 770, the processor receives a request to download the transformed object. At operation 780, in response to receiving a request to download the transformed object, the processor compares the metadata of the object stored in the source bucket to the cached metadata. In some embodiments, the metadata stored in the source bucket indicates a most current state of the object. In some embodiments, the processor determines whether the metadata stored in the source bucket is different from the cached metadata.

At operation 790, in response to determining that the metadata stored in the source bucket is different from the cached metadata, the processor caches, in the lambda bucket, the metadata stored in the source bucket. In some embodiments, in response to determining that the metadata stored in the source bucket is not different from the cached metadata, the processor waits to receive another request to download the transformed object, in which case the method 700 returns to the operation 770.

In some embodiments, in response to determining that the metadata of the object stored in the source bucket being different from the cached metadata, retransform the object, by compute resources of the object store, using the predefined transformation. In some embodiments, cache the retransformed object in the lambda bucket.

Figure 8:
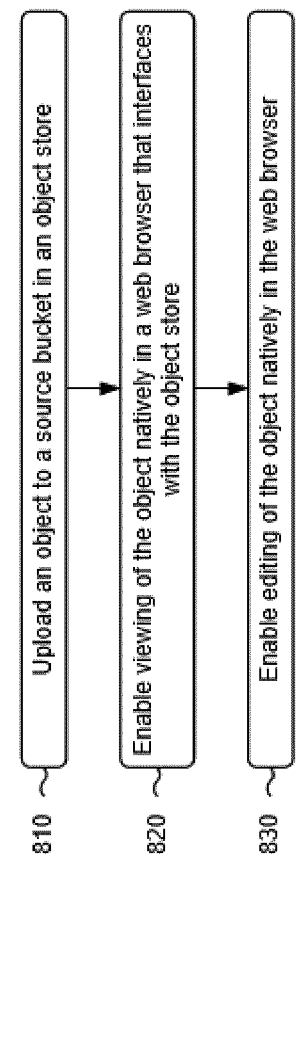
FIG. 8 is a flowchart of an example method for natively previewing and editing objects, in accordance with some embodiments of the present disclosure.

FIG. 8 is a flowchart of an example method 800 for natively previewing and editing objects, in accordance with some embodiments of the present disclosure. The method 800 may be implemented using, or performed by, one of the object store environments 100-300, one or more components of the one of the object store environments 100-300 (e.g., the object controller 202, the object controller 108, or both), one or more processors associated with the one of the object store environments 100-300, or one or more processors associated with the one or more components of the one of the object store environments 100-300. Additional, fewer, or different operations may be performed in the method 800 depending on the embodiment.

At operation 810, the processor (e.g., a processor associated with the object controller 108 and the object controller 202) uploads an object to a source bucket (e.g., the source bucket 104) in an object store (e.g., the object store 101). At operation 820, the processor enables viewing of the object natively in a web browser that interfaces with the object store. At operation 830, the processor enables editing of the object natively in the web browser.

In some embodiments, the processor creates a lambda bucket (e.g., the lambda bucket 106) in the object store that is symlinked to the source bucket. In some embodiments, the lambda bucket is associated with a predefined transformation (e.g., the function 204). In some embodiments, the processor detects that the object is in the source bucket. In some embodiments, the processor fetches the object from the source bucket. In some embodiments, the processor transforms the object, by compute resources of the object store, using the predefined transformation. In some embodiments, the processor enables viewing of the transformed object natively in the web browser. In some embodiments, the processor enables editing of the transformed object natively in the web browser.

Figure 9:
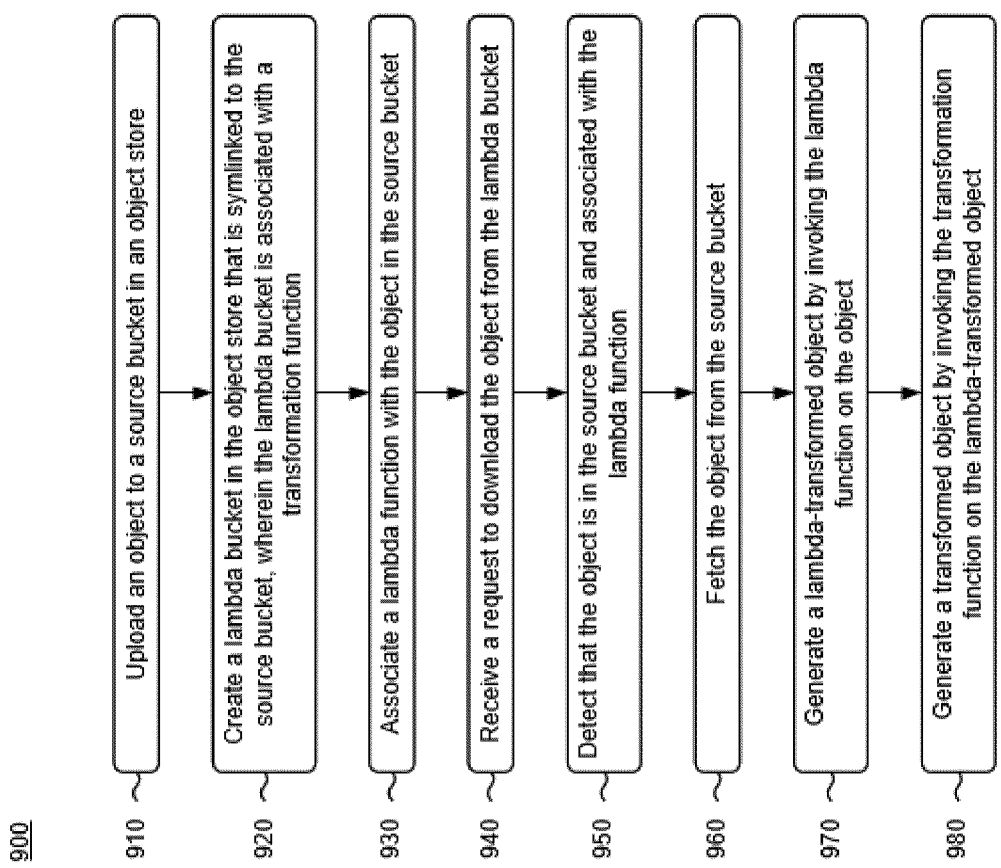
FIG. 9 is a flowchart of an example method for associating lambda functions with objects, in accordance with some embodiments of the present disclosure.

FIG. 9 is a flowchart of an example method 900 for associating lambda functions with objects, in accordance with some embodiments of the present disclosure. The method 900 may be implemented using, or performed by, one of the object store environments 100-300, one or more components of the one of the object store environments 100-300 (e.g., the object controller 202, the object controller 108, or both), one or more processors associated with the one of the object store environments 100-300, or one or more processors associated with the one or more components of the one of the object store environments 100-300. Additional, fewer, or different operations may be performed in the method 900 depending on the embodiment.

At operation 910, the processor (e.g., a processor associated with the object controller 108 and the object controller 202) uploads an object to a source bucket (e.g., the source bucket 104) in an object store (e.g., the object store 101). At operation 920, the processor creates a lambda bucket (e.g., the lambda bucket 106) in the object store. In some embodiments, the lambda bucket is symlinked to the source bucket. At operation 930, the lambda bucket is associated with a predefined transformation (e.g., the function 204). In some embodiments, the processor associates a lambda function with the object in the source bucket. In some embodiments, the processor creates a lambda function that is associated with the object in the source bucket.

At operation 940, the processor receives a request to download the object from the lambda bucket. At operation 950, the processor detects that the object is in the source bucket and associated with the lambda function. At operation 960, the processor fetches the object from the source bucket. At operation 970, the processor generates a lambda-transformed object by invoking the lambda function on the object. At operation 980, the processor generates a transformed object by invoking the transformation function on the lambda-transformed object. At operation 990, the processor downloads the transformed object. In some embodiments, operations 950-990 are in response to receiving the request.

Figure 10:
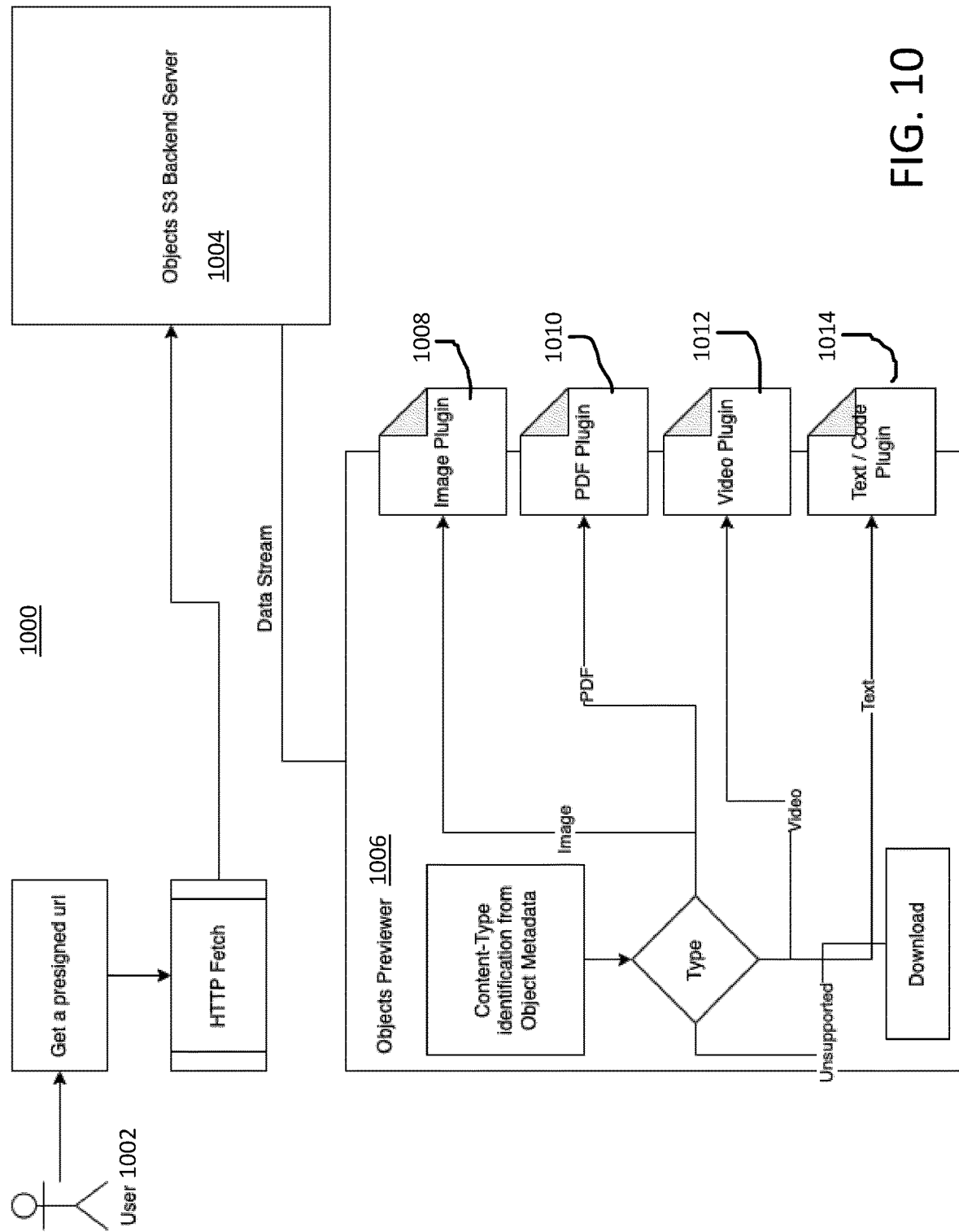
FIG. 10 is an example block diagram of an object store environment 1000, in accordance with some embodiments of the present disclosure.

FIG. 10 is an example block diagram of an object store environment 1000, in accordance with some embodiments of the present disclosure. The object store environment 1000 can be used to preview an object. The object store environment 1000 may be an implementation of one of the object store environments 100-300. The object store environment 100 includes a user 1002. The user 1002 may get (e.g., access, read, etc.) a presigned URL. The URL may be associated with a source bucket 104 or a lambda bucket 106. The user may fetch a bucket, an object, or an object preview associated with the URL by sending an HTTP fetch. Although the user 1002 is depicted is a person, the user 1002 may be another system, apparatus, program, etc.

In some embodiments, the object store environment 1000 includes an objects S3 backend server 1004 (referred to herein as the backend server 1004) coupled to the user 1002. The backend server 1004 may receive the HTTP fetch from the user 1002. In response to receiving the HTTP fetch, data may be streamed between the backend server 1004 and an objects previewer 1006. Although the backend server 1004 is depicted as an objects S3 backend server, the backend server 1004 may use any kind of protocol, including Swift, small computer system interface (SCSI), iSCSI, network file system (NFS), or a native protocol. In some embodiments, the backend server 1004 may include one or more of the object store 101, the object controller 108, the storage vdisk 110, the function invocation framework 112, the protocol adapter, or the metadata service 206.

In some embodiments, the object store environment 1000 includes the objects previewer 1006 coupled to the backend server 1004. The objects previewer 1006 may receive content-type identification from object metadata, which may be accessed from the backend server 1004. The objects previewer 1006 may determine a type of object. The type may be one of an image object (e.g., an image), a portable document format (PDF) object (e.g., a PDF), a video object (e.g., a video), a text object (e.g., text), or an audio object (e.g., audio). If the type is supported, the objects previewer 1006 may access the appropriate plugin that is integrated with the objects previewer 1006. For example, if the type is an image object, the objects previewer 1006 accesses an image plugin. In some embodiments, plugins include any number of an image plugin 1008, a PDF plugin 1010, a video plugin 1012, a text/code plugin 1014 (referred to herein as the text plugin 1014), or an audio plugin 1016.

Each of the plugins may enable previewing or editing the corresponding type of object. In some embodiments, the objects previewer 1006 and/or each of the plugins provide an application programming interface (API) that enables communication between the objects previewer 1006 and each of the plugins. Other plugins may be supported by the objects previewer 1006. If the type is not supported, the objects previewer 1006 may download and install the appropriate plugin. In some embodiments, the objects previewer 1006 is included in the object controller 108 and/or the object controller 202. In some embodiments, the objects previewer 1006 is included in the object store 101. In some embodiments, the preview is streamed back to the backend server 1004 and returned to the user 1002. In some embodiments, the user 1002 views or edits the preview through a user interface such as a web browser, web portal, or other user interface.

Figure 11:
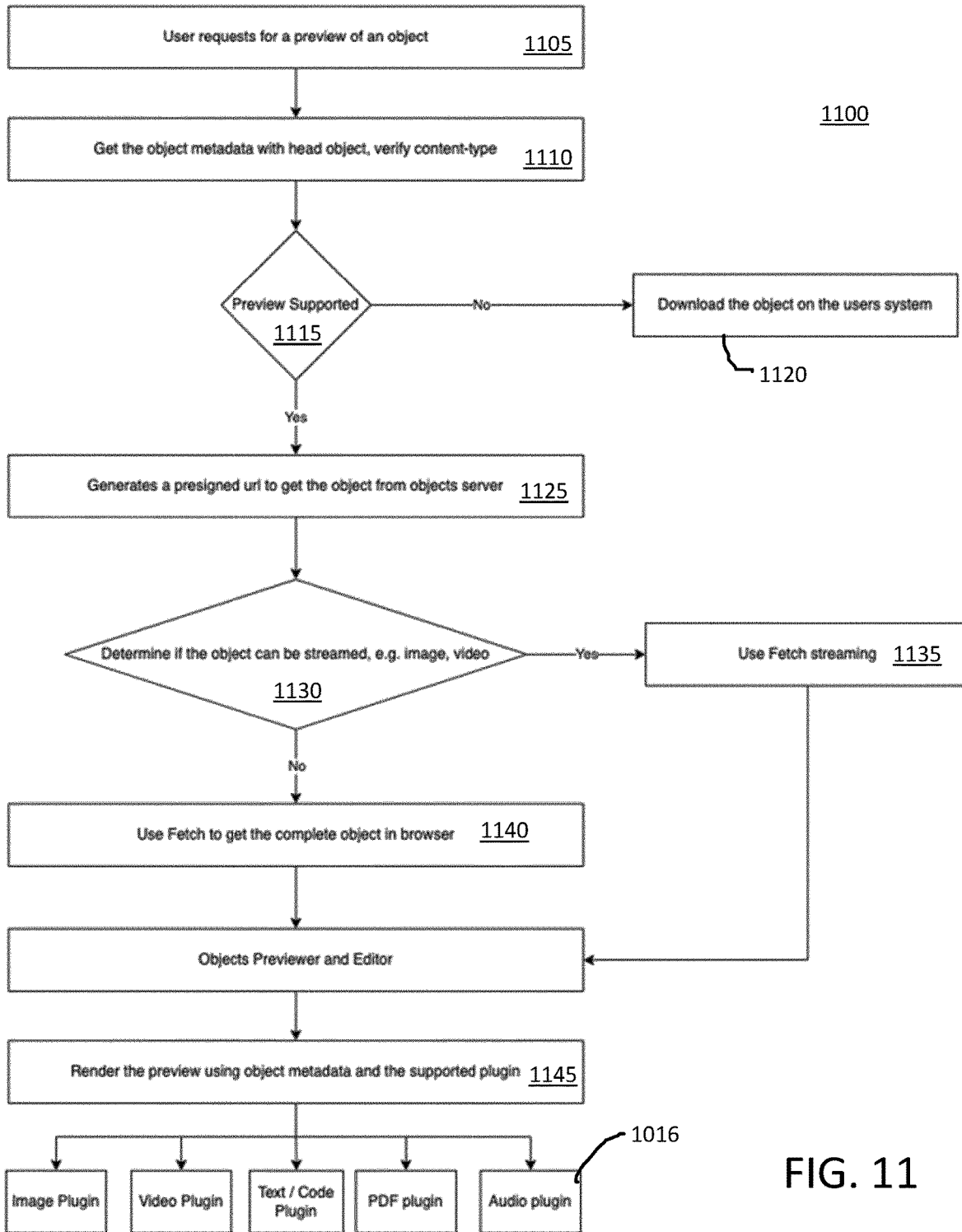
FIG. 11 is a flowchart of an example method for previewing an object, in accordance with some embodiments of the present disclosure.

FIG. 11 is a flowchart of an example method 1100 for previewing an object, in accordance with some embodiments of the present disclosure. The method 1100 may be implemented using, or performed by, one of the object store environments 100-300 or 1000, one or more components of the one of the object store environments 100-300 or 1000 (e.g., the objects previewer 1006), one or more processors associated with the one of the object store environments 100-300 or 1000, or one or more processors associated with the one or more components of the one of the object store environments 100-300 or 1000. Additional, fewer, or different operations may be performed in the method 1100 depending on the embodiment.

At operation 1105, the user 1002 requests for a preview of an object. At operation 1110, the objects previewer 1006 gets the object metadata with a Head Object and verifies the content type. At operation 1115, the objects previewer 1006 determines whether the preview is supported. At operation 1120, in response to determining that the preview is not supported, the objects previewer 1006 downloads the object on the user's system. At operation 1125, in response to determining that the preview is supported, the objects previewer 1006 generates a presigned URL to get the object from the objects backend server 1004. At operation 1130, the objects previewer 1006 determines if the object can be streamed, e.g., an image, a video, etc. At operation 1135, in response to determining that the object can be streamed, the objects previewer 1006 uses fetch streaming. At operation 1140, in response to determining that the object cannot be streamed, the objects previewer 1006 uses fetch to get the compute object in the browser. At operation 1145 (after either the operation 1135 or the operation 1140), the objects previewer renders (e.g., in the browser) the object using object metadata and the supported plugin.

Figure 12:
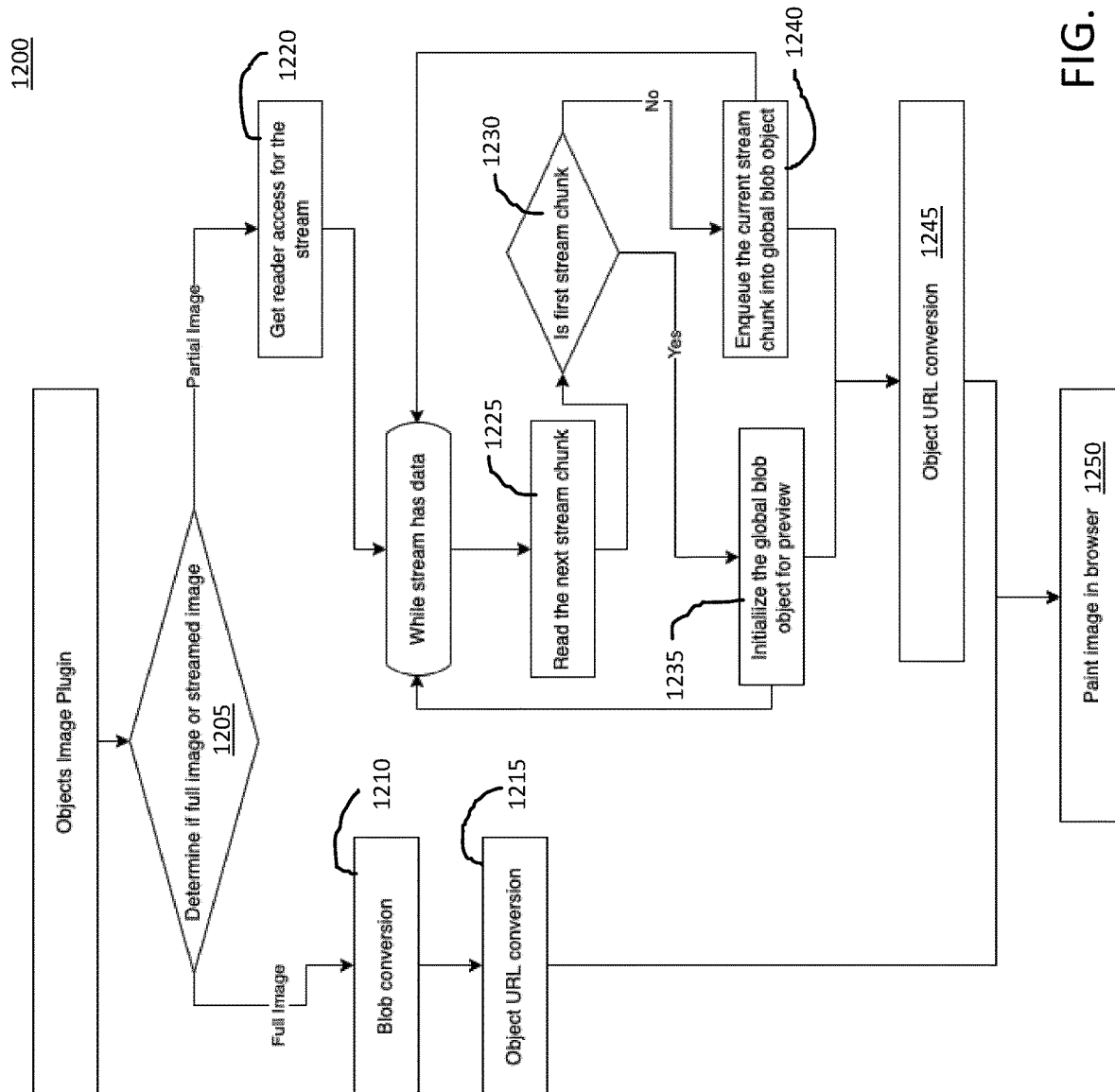
FIG. 12 is a flowchart of an example method for previewing an image, in accordance with some embodiments of the present disclosure.

FIG. 12 is a flowchart of an example method 1200 for previewing an image, in accordance with some embodiments of the present disclosure. The method 1200 may be implemented using, or performed by, one of the object store environments 100-300 or 1000, one or more components of the one of the object store environments 100-300 or 1000 (e.g., the image plugin 1008), one or more processors associated with the one of the object store environments 100-300 or 1000, or one or more processors associated with the one or more components of the one of the object store environments 100-300 or 1000. Additional, fewer, or different operations may be performed in the method 1200 depending on the embodiment.

At operation 1205, the image plugin 1008 determines if the image is a full image or streamed/partial image. At operation 1210, in response to determining that the image is a full image, the image plugin 1008 performs a binary large object (blob) conversion of the full image. At operation 1215, the image plugin 1008 performs an object URL conversion of the full image. At operation 1220, in response to determining that the image is a streamed/partial image, the image plugin 1008 gets reader access for the stream. Operations 1225-1240 are performed during streaming of data. At operation 1225, the image plugin 1008 reads the next stream chunk. At operation 1230, the image plugin 1008 determines whether the next stream chunk is the first stream chunk. At operation 1235, in response to determining that the next stream chunk is the first stream chunk, the image plugin 1008 initializes the global blob object for preview. At operation 1240, in response to determining that the next stream chunk is not the first stream chunk, the image plugin 1008 enqueues the current stream chunk into global blob object. If there are additional stream chunks, the method 1200 returns to the operation 1225. If there are no additional stream chunks, the method 1200 proceeds to operation 1245. At operation 1245, the image plugin 1008 performs an object URL conversion of the full image. At operation 1250 (after either the operation 1215 or the operation 1245), the image plugin 1008 paints the image in a browser.

Figure 13:
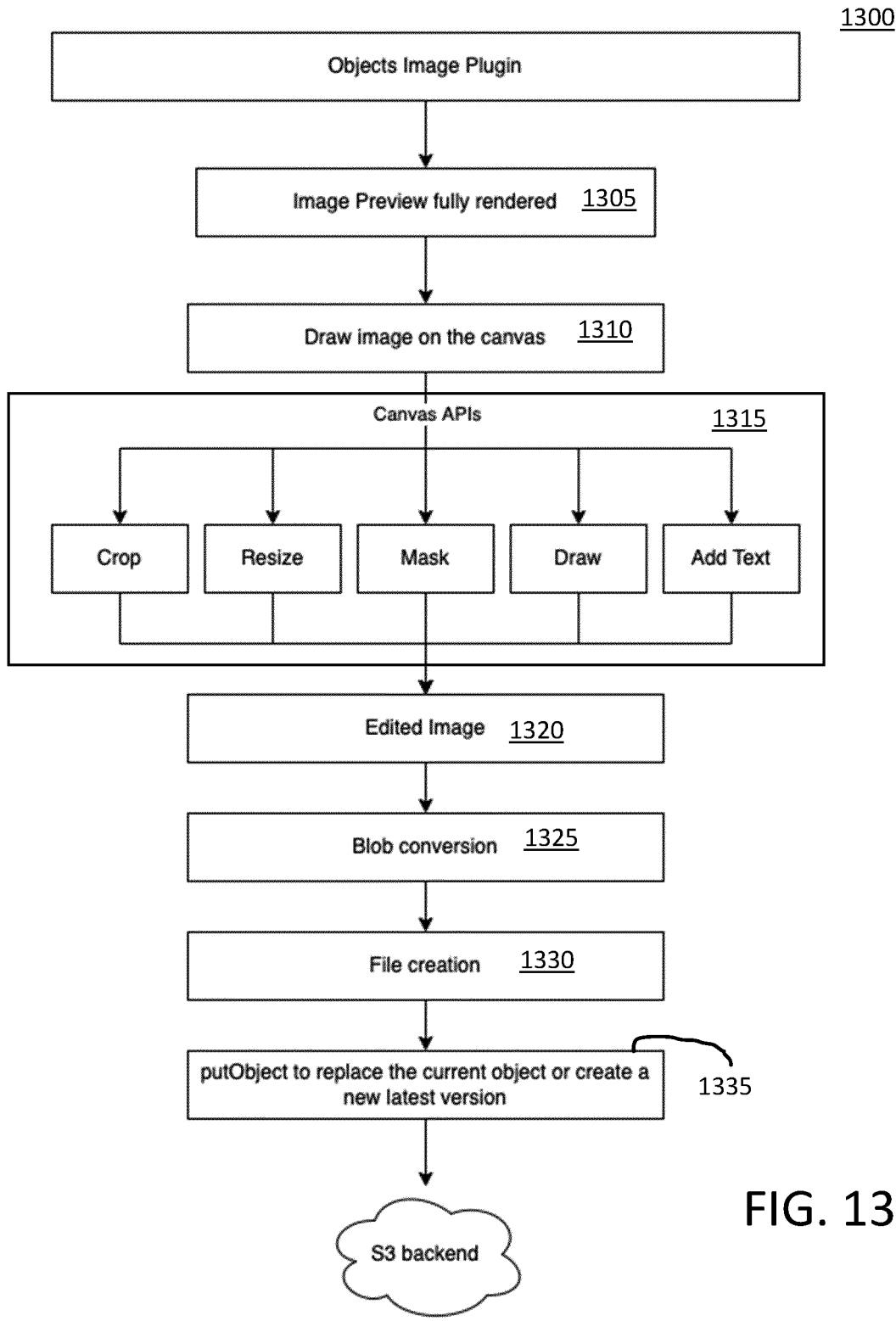
FIG. 13 is a flowchart of an example method for previewing an image, in accordance with some embodiments of the present disclosure.

FIG. 13 is a flowchart of an example method 1300 for previewing an image, in accordance with some embodiments of the present disclosure. The method 1300 may be implemented using, or performed by, one of the object store environments 100-300 or 1000, one or more components of the one of the object store environments 100-300 or 1000 (e.g., the image plugin 1008), one or more processors associated with the one of the object store environments 100-300 or 1000, or one or more processors associated with the one or more components of the one of the object store environments 100-300 or 1000. Additional, fewer, or different operations may be performed in the method 1300 depending on the embodiment. The method 1300 may be related to the method 1200.

At operation 1305, the image plugin 1008 renders the preview. At operation 1310, the image plugin 1008 or the user 1002 draws the image on the canvas. At operation 1315, the image plugin 1008 sends or receives an API call to a canvas API. The canvas API can include one or more of a crop API, a resize API, a mask API, a draw API, or an add text API. At operation 1320, the image is edited. At operation 1325, the image plugin 1008 performs a blob conversion. At operation 1330, the image plugin 1008 creates a file. At operation 1335, the image plugin 1008 generates and/or sends a putObject to replace the current object or create a new latest version.

Figure 14:
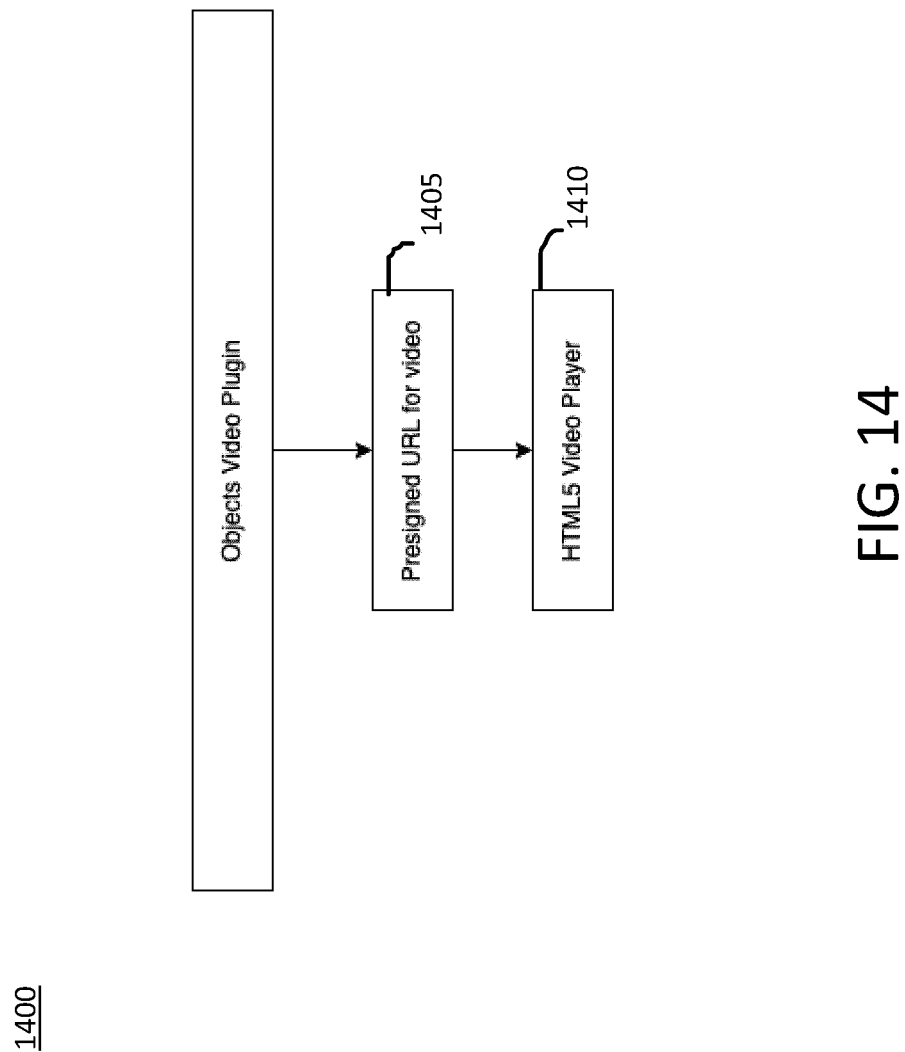
FIG. 14 is a flowchart of an example method for previewing a video, in accordance with some embodiments of the present disclosure.

FIG. 14 is a flowchart of an example method 1400 for previewing a video, in accordance with some embodiments of the present disclosure. The method 1400 may be implemented using, or performed by, one of the object store environments 100-300 or 1000, one or more components of the one of the object store environments 100-300 or 1000 (e.g., the video plugin 1012), one or more processors associated with the one of the object store environments 100-300 or 1000, or one or more processors associated with the one or more components of the one of the object store environments 100-300 or 1000. Additional, fewer, or different operations may be performed in the method 1400 depending on the embodiment.

At operation 1405, the video plugin 1012 receives a presigned URL for video. At operation 1410, the video plugin 1012 sends the video or the URL to a hypertext markup language 5 (HTML5) video player. Although an HTML5 audio player is depicted in the operation 1410, the video plugin 1012 can send the video or the URL to an audio player of any markup language or format.

Figure 15:
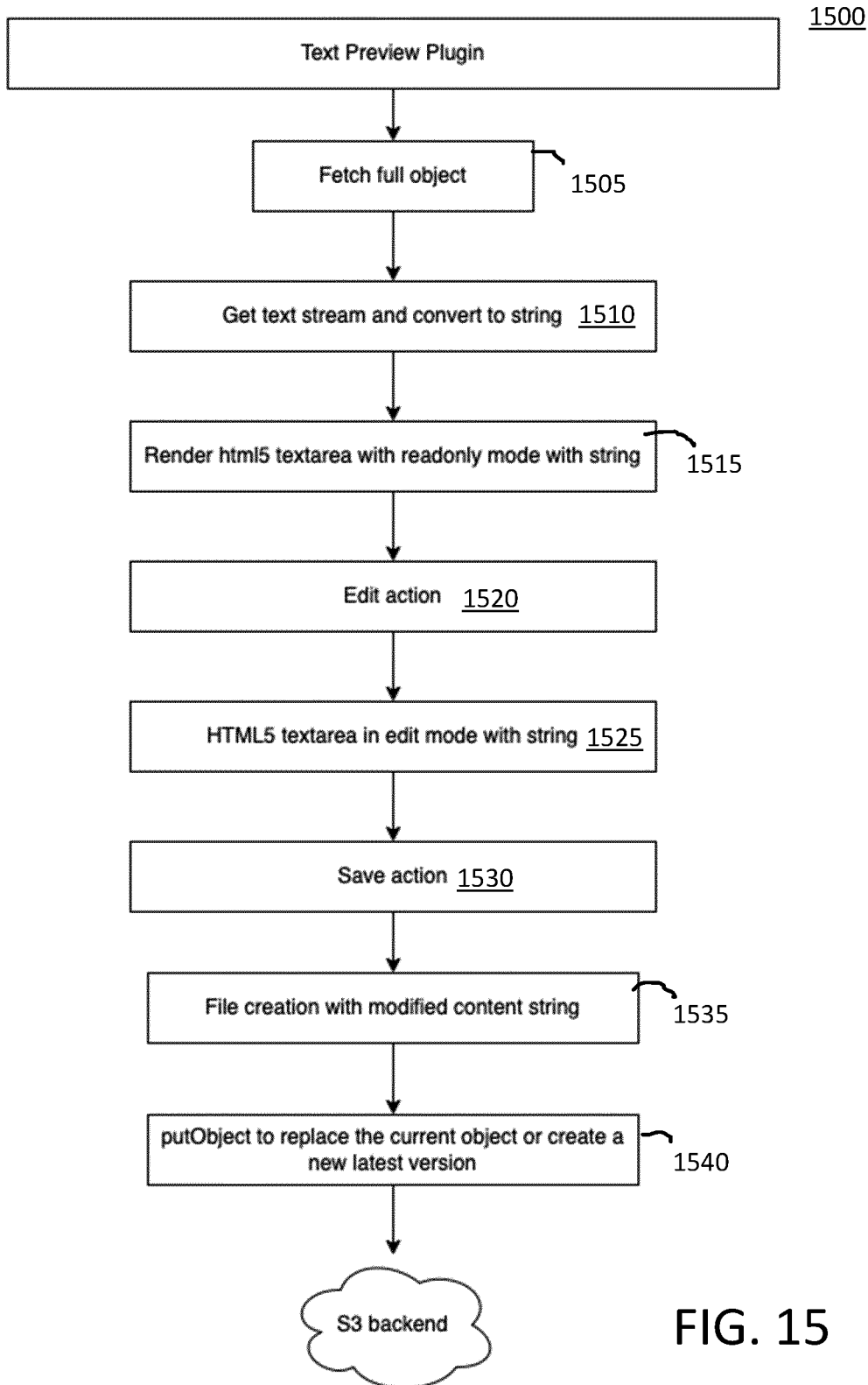
FIG. 15 is a flowchart of an example method for previewing text, in accordance with some embodiments of the present disclosure.

FIG. 15 is a flowchart of an example method 1500 for previewing text, in accordance with some embodiments of the present disclosure. The method 1500 may be implemented using, or performed by, one of the object store environments 100-300 or 1000, one or more components of the one of the object store environments 100-300 or 1000 (e.g., the text plugin 1014), one or more processors associated with the one of the object store environments 100-300 or 1000, or one or more processors associated with the one or more components of the one of the object store environments 100-300 or 1000. Additional, fewer, or different operations may be performed in the method 1500 depending on the embodiment.

At operation 1505, the text plugin 1014 fetches the full object. At operation 1510, the text plugin 1014 gets text stream and converts the text stream to a string. At operation 1515, the text plugin 1014 renders HTML5 textarea with read-only mode with string. At operation 1520, the text plugin 1014 edits an action (e.g., sends an edit action). At operation 1525, the text plugin 1014 renders, or causes rendering of, HTML5 textarea in edit mode with string. At operation 1530, the text plugin 1014 saves the action. At operation 1535, the text plugin 1014 creates a file with modified content string. At operation 1540, the text plugin 1014 generates and/or sends a putObject to replace the current object or create a new latest version.

Figure 16:
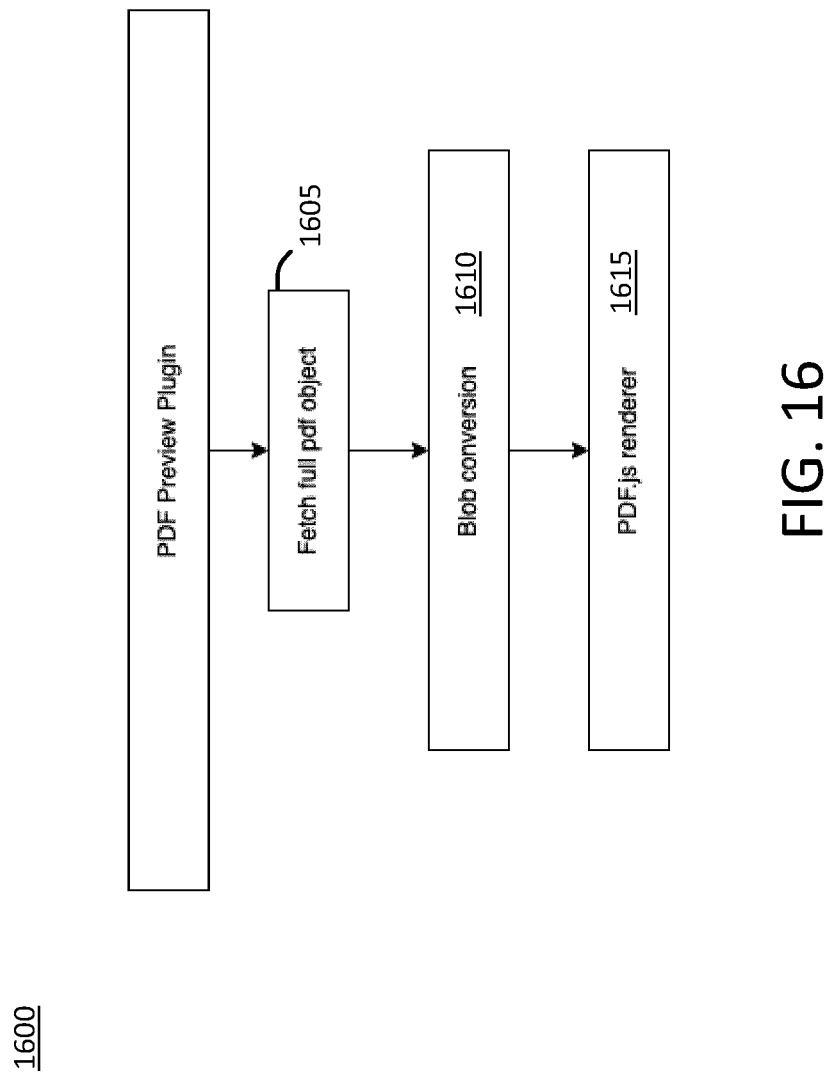
FIG. 16 is a flowchart of an example method for previewing a PDF, in accordance with some embodiments of the present disclosure.

FIG. 16 is a flowchart of an example method 1600 for previewing a PDF, in accordance with some embodiments of the present disclosure. The method 1600 may be implemented using, or performed by, one of the object store environments 100-300 or 1000, one or more components of the one of the object store environments 100-300 or 1000 (e.g., the PDF plugin 1010), one or more processors associated with the one of the object store environments 100-300 or 1000, or one or more processors associated with the one or more components of the one of the object store environments 100-300 or 1000. Additional, fewer, or different operations may be performed in the method 1600 depending on the embodiment.

At operation 1605, the PDF plugin 1010 fetches a full PDF object. At operation 1610, the PDF plugin 1010 performs a blob conversion. At operation 1615, the PDF plugin renders the PDF.

FIG. 17 is a flowchart of an example method 1700 for previewing audio, in accordance with some embodiments of the present disclosure. The method 1700 may be implemented using, or performed by, one of the object store environments 100-300 or 1000, one or more components of the one of the object store environments 100-300 or 1000 (e.g., the audio plugin 1016), one or more processors associated with the one of the object store environments 100-300 or 1000, or one or more processors associated with the one or more components of the one of the object store environments 100-300 or 1000. Additional, fewer, or different operations may be performed in the method 1700 depending on the embodiment.

At operation 1705, the audio plugin 1016 receives a presigned URL for audio. At operation 1710, the audio plugin 1016 sends the audio or the URL to an HTML5 audio player. Although an HTML5 audio player is depicted in the operation 1710, the audio plugin 1016 can send the audio or the URL to an audio player of any markup language or format.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus comprising a processor and a memory, wherein the memory includes programmed instructions that, when executed by the processor, cause the apparatus to:
   upload an object to a source bucket in an object store;
   create a lambda bucket in the object store that is symlinked to the source bucket, wherein the lambda bucket is associated with a predefined transformation;
   receive a request to download the object from the lambda bucket;
   in response to uploading the object to the source bucket or updating the object in the source bucket,
      detect that the object is in the source bucket;
      fetch the object from the source bucket; and
      transform the object, by compute resources of the object store, using the predefined transformation; and
   download the transformed object in response to receiving the request.

2. The apparatus of claim 1, wherein the memory includes the programmed instructions that, when executed by the processor, cause the apparatus to:
   cache the transformed object in the lambda bucket; and
   set a lifecycle policy on the lambda bucket that causes the transformed object to be deleted upon a predefined time elapsing.

3. The apparatus of claim 1, wherein the memory includes the programmed instructions that, when executed by the processor, further cause the apparatus to:
   create a second lambda bucket in the object store that is symlinked to the lambda bucket, wherein the second lambda bucket is associated with a second predefined transformation; and
   transform the transformed object, by the compute resources of the object store, using the second predefined transformation, to generate a second transformed object.

4. The apparatus of claim 1, wherein the memory includes the programmed instructions that, when executed by the processor, further cause the apparatus to:
   enable viewing of the transformed object natively in a web browser; and
   enable editing of the transformed object natively in the web browser.

5. The apparatus of claim 1, wherein detecting that the object is in the source bucket;
   fetching the object from the source bucket; transforming the object, by the compute resources of the object store, using the predefined transformation; and downloading the transformed object are in response to receiving the request.

6. The apparatus of claim 1, wherein the memory includes the programmed instructions that, when executed by the processor, further cause the apparatus to:
   in response to uploading the object to the source bucket or updating the object in the source bucket, cache the transformed object in the lambda bucket.

7. The apparatus of claim 6, wherein the memory includes the programmed instructions that, when executed by the processor, further cause the apparatus to:
   in response to receiving the request to download the transformed object, compare metadata of the object stored in the source bucket to the cached metadata; and
   in response to determining that the metadata stored in the source bucket is different from the cached metadata, cache, in the lambda bucket, the metadata stored in the source bucket.

8. A non-transitory computer readable storage medium comprising instructions stored thereon that, when executed by a processor, cause the processor to:
   upload an object to a source bucket in an object store;
   create a lambda bucket in the object store that is symlinked to the source bucket, wherein the lambda bucket is associated with a predefined transformation;
   receive a request to download the object from the lambda bucket;
   in response to uploading the object to the source bucket or updating the object in the source bucket,
      detect that the object is in the source bucket;
      fetch the object from the source bucket; and
      transform the object, by compute resources of the object store, using the predefined transformation; and
   download the transformed object in response to receiving the request.

9. The medium of claim 8, comprising the instructions stored thereon that, when executed by the processor, further cause the processor to:
   cache the transformed object in the lambda bucket; and
   set a lifecycle policy on the lambda bucket that causes the transformed object to be deleted upon a predefined time elapsing.

10. The medium of claim 8, comprising the instructions stored thereon that, when executed by the processor, further cause the processor to:
   create a second lambda bucket in the object store that is symlinked to the lambda bucket, wherein the second lambda bucket is associated with a second predefined transformation; and
   transform the transformed object, by the compute resources of the object store, using the second predefined transformation, to generate a second transformed object.

11. The medium of claim 8, comprising the instructions stored thereon that, when executed by the processor, further cause the processor to:
- enable viewing of the transformed object natively in a web browser; and
- enable editing of the transformed object natively in the web browser.

12. The medium of claim 8, wherein detecting that the object is in the source bucket;
- fetching the object from the source bucket;
- transforming the object, by the compute resources of the object store, using the predefined transformation; and
- downloading the transformed object are in response to receiving the request.

13. A computer-implemented method comprising:
- uploading, by a processor, an object to a source bucket in an object store;
- creating, by the processor, a lambda bucket in the object store that is symlinked to the source bucket, wherein the lambda bucket is associated with a predefined transformation;
- receiving, by the processor, a request to download the object from the lambda bucket;
- in response to uploading the object to the source bucket or updating the object in the source bucket,
  - detecting, by the processor, that the object is in the source bucket;
  - fetching, by the processor, the object from the source bucket; and
  - transforming, by the processor, the object, by compute resources of the object store, using the predefined transformation; and
  - downloading, by the processor, the transformed object in response to receiving the request.

14. The method of claim 13, further comprising:
- caching, by the processor, the transformed object in the lambda bucket; and
- setting, by the processor, a lifecycle policy on the lambda bucket that causes the transformed object to be deleted upon a predefined time elapsing.

15. The method of claim 13, further comprising:
- creating, by the processor, a second lambda bucket in the object store that is symlinked to the lambda bucket, wherein the second lambda bucket is associated with a second predefined transformation; and
- transforming, by the processor, the transformed object, by the compute resources of the object store, using the second predefined transformation, to generate a second transformed object.

16. The method of claim 13, further comprising:
- enabling, by the processor, viewing of the transformed object natively in a web browser; and
- enabling, by the processor, editing of the transformed object natively in the web browser.

17. The method of claim 13, wherein detecting that the object is in the source bucket;
- fetching the object from the source bucket; transforming the object, by the compute resources of the object store, using the predefined transformation; and downloading the transformed object are in response to receiving the request.

* * * * *